US012395628B2

(12) United States Patent
Hu et al.

(10) Patent No.: US 12,395,628 B2
(45) Date of Patent: Aug. 19, 2025

(54) ADAPTIVE LOOP FILTER WITH SAMPLES BEFORE DEBLOCKING FILTER AND SAMPLES BEFORE SAMPLE ADAPTIVE OFFSETS

(71) Applicant: QUALCOMM Incorporated, San Diego, CA (US)

(72) Inventors: Nan Hu, San Diego, CA (US); Vadim Seregin, San Diego, CA (US); Venkata Meher Satchit Anand Kotra, Munich (DE); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 137 days.

(21) Appl. No.: 18/181,359

(22) Filed: Mar. 9, 2023

(65) Prior Publication Data

US 2023/0300328 A1 Sep. 21, 2023

Related U.S. Application Data

(60) Provisional application No. 63/269,207, filed on Mar. 11, 2022.

(51) Int. Cl.
*H04N 19/117* (2014.01)
*H04N 19/132* (2014.01)
(Continued)

(52) U.S. Cl.
CPC ......... *H04N 19/117* (2014.11); *H04N 19/132* (2014.11); *H04N 19/136* (2014.11);
(Continued)

(58) Field of Classification Search
None
See application file for complete search history.

(56) References Cited

U.S. PATENT DOCUMENTS 11,146,826 B2 * 10/2021 An ...................... H04N 19/136
11,659,164 B1 * 5/2023 Deng ..................... H04N 19/30
375/240.02

(Continued)

FOREIGN PATENT DOCUMENTS

WO 2021057946 A1 4/2021

OTHER PUBLICATIONS

Chang Y-J., et al., (Qualcomm): "EE2: Tests of Compression Efficiency Methods Beyond VVC," 22. JVET Meeting, Apr. 20, 2021-Apr. 28, 2021, Teleconference, (The Joint Video Exploration Team of ISO/IEC JTC1/SC29/WG11 and ITU-T SG.16 WP 3), No. JVET-V0120-V2, m56535, Apr. 22, 2021, pp. 1-31, XP030294307, Sections 4.6 and 4.10.

(Continued)

*Primary Examiner* — Stefan Gadomski
(74) *Attorney, Agent, or Firm* — Shumaker & Sieffert, P.A.

(57) ABSTRACT

A device for decoding video data determines a pre-filtered reconstructed block of video data; applies one or more of a deblocking filter or a sample adaptive offset filter to the pre-filtered reconstructed block to determine a filtered reconstructed block; applies an adaptive loop filter (ALF) to the filtered reconstructed block to determine a final filtered reconstructed block, wherein to apply the ALF to the filtered reconstructed block, the device is further configured to determine a difference value based on a difference between a value of a current sample of the filtered reconstructed block and a value of a pre-filtered neighboring sample; apply a filter to the difference value to determine a sample modification value; and determine a final filtered sample value based on the sample modification value.

33 Claims, 28 Drawing Sheets

(51) Int. Cl.
*H04N 19/136* (2014.01)
*H04N 19/172* (2014.01)
*H04N 19/176* (2014.01)
*H04N 19/82* (2014.01)

(52) U.S. Cl.
CPC .......... *H04N 19/176* (2014.11); *H04N 19/82* (2014.11); *H04N 19/172* (2014.11)

(56) References Cited

U.S. PATENT DOCUMENTS

| | | | | |
|---|---|---|---|---|
| 2017/0339432 | A1* | 11/2017 | Chao | H04N 19/439 |
| 2020/0404335 | A1 | 12/2020 | Egilmez et al. | |
| 2021/0092368 | A1* | 3/2021 | Du | H04N 19/46 |
| 2021/0385446 | A1* | 12/2021 | Liu | H04N 19/132 |
| 2022/0109853 | A1* | 4/2022 | Zhang | H04N 19/117 |
| 2022/0109885 | A1* | 4/2022 | Deng | H04N 19/593 |
| 2022/0109889 | A1* | 4/2022 | Zhang | H04N 19/46 |
| 2022/0150540 | A1* | 5/2022 | Xu | H04N 19/132 |
| 2022/0191475 | A1* | 6/2022 | Xu | H04N 19/105 |
| 2022/0201292 | A1* | 6/2022 | Karczewicz | H04N 19/182 |
| 2022/0279185 | A1* | 9/2022 | Zhu | H04N 19/82 |
| 2022/0286666 | A1* | 9/2022 | Zhu | H04N 19/176 |
| 2022/0286695 | A1* | 9/2022 | Li | H04N 19/176 |
| 2022/0286709 | A1* | 9/2022 | Zhu | H04N 19/463 |
| 2022/0303529 | A1* | 9/2022 | Lai | H04N 19/186 |
| 2023/0010869 | A1 | 1/2023 | Hu et al. | |
| 2023/0091813 | A1* | 3/2023 | Liu | H04N 19/117 375/240.02 |
| 2023/0379460 | A1* | 11/2023 | Andersson | H04N 19/157 |

OTHER PUBLICATIONS

Chen J., et al., "Algorithm Description for Versatile Video Coding and Test Model 2 (VTM 2)," 11. JVET Meeting, Jul. 10, 2018-Jul. 18, 2018, Ljubljana, (The Joint Video Exploration Team of ISO/IEC JTC1/SC29/WG11 and ITU-TSG.16 WP 3), No. JVET-K1002-v1, Aug. 10, 2018 (Aug. 10, 2018), XP030193537, 19 Pages, Sections 1-3, figure 1.

Chen J., et al., "Algorithm Description of Joint Exploration Test Model 7 (JEM7)," 119 . MPEG Meeting, 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. m41357, No. G1001_v1, JVET-G1001, 7th Meeting, Jul. 13, 2017-Jul. 21, 2017, Torino, IT, N17055, Aug. 19, 2017, XP030150980, 48 Pages.

Coban M., et al., "Algorithm Description of Enhanced Compression Model 3 (ECM 3)," JVET-X2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-28.

Coban M., et al., "Algorithm description of Enhanced Compression Model 5 (ECM 5)," JVET-Z2025, Joint Video Experts Team (JVET) of ITU-T SG 16 WP 3 and ISO/IEC JTC 1/SC 29, 26th Meeting, by teleconference, Apr. 20-29, 2022, pp. 1-45.

Coban M., et al., "Algorithm Description of Enhanced Compression Model 4 (ECM 4)," JVET-Y2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-32.

Coban M., et al., "Preliminary Draft of Algorithm Description for Enhanced Compression Model 1 Software (ECM 1)," JVET-W0102-v2, Joint Video Expe1ts Team (JVET) of ITU-T SG 16 WP 3 and ISO/IEC JTC 1/SC 29, 23rd Meeting by Teleconference Jul. 7-16, 2021, pp. 1-18.

Hu N., et al., "AHG12: Using Samples Before Deblocking Filter for Adaptive Loop Filter," JVET-Z0146-v1, Joint Video Experts Team (JVET) of ITU-T SG 16 WP 3 and ISO/IEC JTC 1/SC 29, 26th Meeting, by teleconference, Apr. 20-29, 2022, pp. 1-4.

Hu N., et al., "EE2-5: Adaptive filter Shape Switch and Using Samples before Deblocking Filter for Adaptive Loop Filter," JVET-AA0095-v1, Joint Video Experts Team (JVET) of ITU-T SG 16 WP 3 and ISO/IEC JTC 1/SC 29, 27th Meeting, by teleconference, Jul. 13-22, 2022, pp. 1-8.

Itu-T H.265: "Series H: Audiovisual and Multimedia Systems Infrastructure of Audiovisual Services—Coding of Moving Video," High Efficiency Video Coding, The International Telecommunication Union, Jun. 2019, 696 Pages.

Tu-T H.266: "Series H: Audiovisual and Multimedia Systems Infrastructure of Audiovisual Services—Coding of Moving Video," Versatile Video Coding, The International Telecommunication Union, Aug. 2020, 516 pages.

Karczewicz M., et al., "Common Test Conditions and Evaluation Procedures for Enhanced Compression Tool Testing," JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Kuo C-W., et al., "EE2-5.1: Cross-Component Sample Adaptive Offset," 23, JVET Meeting, Jul. 7, 2021-Jul. 16, 2021, Teleconference, (The Joint Video Exploration Team of ISO/IEC JTC1/SC29/WG11 and ITU-TSG.16), No. JVET-W0066, m57178, Jul. 1, 2021, XP030295926, pp. 1-5, Abstract Sections 1 and 2.

Yin W., et al., "EE2-5.2: Adaptive Filter Shape Selection for ALF," JVET-Y0147-v2, Joint Video Experts Team (JVET) of ITU-T SG 16 WP 3 and ISO/IEC JTC 1/SC 29, 25th Meeting, by teleconference, Jan. 12-21, 2022, pp. 1-4.

Yin W., et al., "EE2-5.3: Combination Tests of 5.1 and 5.2," JVET-AC0184-r4, Joint Video Experts Team (JVET) of ITU-T SG 16 WP 3 and ISO/IEC JTC 1/SC 29, 29th Meeting, by teleconference, Jan. 11-20, 2023, pp. 1-4.

Yin W., et al., "Non-EE2: Adaptive Filter Shape Switch for ALF," JVET-Z0149-v1, Joint Video Experts Team (JVET), of ITU-T SG 16 WP 3 and ISO/IEC JTC 1/SC 29, 26th Meeting, by Teleconference, Apr. 20-29, 2022, pp. 1-3.

"Algorithm Description of Enhanced Compression Model 3 (ECM 3)," 136. MPEG Meeting, Oct. 11, 2021-Oct. 15, 2021, Online, (Motion Picture Expert Group OR ISO/IEC JTC1/SC29/WG11), No. n20912, Mar. 7, 2022, XP030302419, p. 29.

International Search Report and Written Opinion—PCT/US2023/064108—ISA/EPO—Jun. 14, 2023 11 Pages.

* cited by examiner

702

704

706

704

| $C_x$ | $C_{x+3}$ | |
|---|---|---|
| | $C_{x+2}$ | $C_{x+4}$ |
| | $C_{x+1}$ | |

704

Cross shape:
- Top: $C_{x+3}$
- Middle row: $C_x$, $C_{x+2}$, $C_{x+4}$
- Bottom: $C_{x+1}$

706

Diamond shape:
- Top: $C_{x+8}$
- Row 2: $C_{x+3}$, $C_{x+7}$, $C_{x+11}$
- Middle row: $C_x$, $C_{x+2}$, $C_{x+6}$, $C_{x+10}$, $C_{x+12}$
- Row 4: $C_{x+1}$, $C_{x+5}$, $C_{x+9}$
- Bottom: $C_{x+4}$

708

710

712

716

| | | | | $C_{x+14}$ | | | |
| | | | | $C_{x+13}$ | | | |
| | | | | $C_{x+12}$ | | | |
| | | | $C_{x+5}$ | $C_{x+11}$ | $C_{x+17}$ | | |
| $C_x$ | $C_{x+1}$ | $C_{x+2}$ | $C_{x+4}$ | $C_{x+10}$ | $C_{x+16}$ | $C_{x+18}$ | $C_{x+19}$ | $C_{x+20}$ |
| | | | $C_{x+3}$ | $C_{x+9}$ | $C_{x+15}$ | | |
| | | | | $C_{x+8}$ | | | |
| | | | | $C_{x+7}$ | | | |
| | | | | $C_{x+6}$ | | | |

714

| | | | | $C_{x+11}$ | | |
| | | | | $C_{x+10}$ | | |
| | | | $C_{x+4}$ | $C_{x+9}$ | $C_{x+14}$ | |
| $C_x$ | $C_{x+1}$ | $C_{x+3}$ | $C_{x+8}$ | $C_{x+13}$ | $C_{x+15}$ | $C_{x+16}$ |
| | | $C_{x+2}$ | $C_{x+7}$ | $C_{x+12}$ | | |
| | | | $C_{x+6}$ | | | |
| | | | $C_{x+5}$ | | | |

736

| | | | | $C_{x+6}$ | | | |
| | | | | $C_{x+8}$ | | | |
| | | | | $C_{x+8}$ | | | |
| | | | $C_{x+5}$ | $C_{x+9}$ | $C_{x+3}$ | | |
| $C_x$ | $C_{x+1}$ | $C_{x+2}$ | $C_{x+4}$ | $C_{x+10}$ | $C_{x+4}$ | $C_{x+2}$ | $C_{x+1}$ | $C_x$ |
| | | | $C_{x+3}$ | $C_{x+9}$ | $C_{x+5}$ | | |
| | | | | $C_{x+8}$ | | | |
| | | | | $C_{x+7}$ | | | |
| | | | | $C_{x+6}$ | | | |

734

| | | | $C_{x+5}$ | | | |
| | | | $C_{x+6}$ | | | |
| | | $C_{x+4}$ | $C_{x+7}$ | $C_{x+2}$ | | |
| $C_x$ | $C_{x+1}$ | $C_{x+3}$ | $C_{x+8}$ | $C_{x+3}$ | $C_{x+1}$ | $C_x$ |
| | | $C_{x+2}$ | $C_{x+7}$ | $C_{x+4}$ | | |
| | | | $C_{x+6}$ | | | |
| | | | $C_{x+5}$ | | | |

ADAPTIVE LOOP FILTER WITH SAMPLES BEFORE DEBLOCKING FILTER AND SAMPLES BEFORE SAMPLE ADAPTIVE OFFSETS

This application claims the benefit of U.S. Provisional Patent Application 63/269,207, filed 11 Mar. 2022, the entire content of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure describes techniques associated with filtering reconstructed video data in a video encoding and/or video decoding process and, more particularly, this disclosure describes techniques related to ALF. The described techniques, however, may potentially also be applied to other filtering schemes. According to the techniques of this disclosure, an ALF may be configured to adjust a current sample value, such as a deblock filtered and SAO filtered reconstructed sample, based on a difference between a value of the current sample and a value of a pre-filtered neighboring sample. By accounting for such difference, an ALF in accordance with the techniques of this disclosure may improve coding efficiency without degrading the quality of decoded video data. Deblock filtering removes high frequency data from decoded video data, which may improve the visual quality of decoded video data by removing blocking artifacts. Such high frequency data, however, can improve the quality of ALF. Thus, the techniques of this disclosure may improve coding efficiency without degrading video quality by using high frequency, pre-deblocked video data in the ALF process while still outputting deblock filtered video data.

According to an example of this disclosure, a method of decoding video data includes: determining a pre-filtered reconstructed block of video data; applying one or more of a deblocking filter or a sample adaptive offset filter to the pre-filtered reconstructed block to determine a filtered reconstructed block; and applying an adaptive loop filter (ALF) to the filtered reconstructed block to determine a final filtered reconstructed block, wherein applying the ALF to the filtered reconstructed block comprises: determining a difference value based on a difference between a value of a current sample of the filtered reconstructed block and a value of a pre-filtered neighboring sample; applying a filter to the difference value to determine a sample modification value; and determining a final filtered sample value based on the sample modification value.

According to an example of this disclosure, a device for decoding video data includes: a memory configured to store video data; one or more processors implemented in circuitry and configured to: determine a pre-filtered reconstructed block of video data; apply one or more of a deblocking filter or a sample adaptive offset filter to the pre-filtered reconstructed block to determine a filtered reconstructed block; apply an adaptive loop filter (ALF) to the filtered reconstructed block to determine a final filtered reconstructed block, wherein to apply the ALF to the filtered reconstructed block, the one or more processors are further configured to: determine a difference value based on a difference between a value of a current sample of the filtered reconstructed block and a value of a pre-filtered neighboring sample; apply a filter to the difference value to determine a sample modification value; and determine a final filtered sample value based on the sample modification value.

According to an example of this disclosure, a computer-readable storage medium stores instructions that when executed by one or more processors cause the one or more processors to: determine a pre-filtered reconstructed block of video data; apply one or more of a deblocking filter or a sample adaptive offset filter to the pre-filtered reconstructed block to determine a filtered reconstructed block; apply an adaptive loop filter (ALF) to the filtered reconstructed block to determine a final filtered reconstructed block, wherein to apply the ALF to the filtered reconstructed block, the instructions cause the one or more processors to: determine a difference value based on a difference between a value of a current sample of the filtered reconstructed block and a value of a pre-filtered neighboring sample; apply a filter to the difference value to determine a sample modification value; and determine a final filtered sample value based on the sample modification value.

The details of one or more examples are set forth in the accompanying drawings and the description below. Other features, objects, and advantages will be apparent from the description, drawings, and claims.

DETAILED DESCRIPTION

Video coding (e.g., video encoding and/or video decoding) typically involves predicting a block of video data from either an already coded block of video data in the same picture (i.e., intra prediction) or an already coded block of video data in a different picture (i.e., inter prediction). In some instances, the video encoder also calculates residual data by comparing the predictive block to the original block. Thus, the residual data represents a difference between the predictive block and the original block. The video encoder transforms and quantizes the residual data and signals the transformed and quantized residual data in the encoded bitstream. A video decoder adds the residual data to the predictive block to produce a reconstructed video block that matches the original video block more closely than the predictive block alone. To further improve the quality of decoded video, a video decoder can perform one or more filtering operations on the reconstructed video blocks. Examples of these filtering operations include deblock filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes techniques associated with filtering reconstructed video data in a video encoding and/or video decoding process and, more particularly, this disclosure describes techniques related to ALF. The described techniques, however, may potentially also be applied to other filtering schemes. According to the techniques of this disclosure, an ALF may be configured to adjust a current sample value, such as a deblock filtered and SAO filtered reconstructed sample, based on a difference between a value of the current sample and a value of a pre-filtered neighboring sample. By accounting for such difference, an ALF in accordance with the techniques of this disclosure may improve coding efficiency without degrading the quality of decoded video data. Deblock filtering removes high frequency data from decoded video data, which may improve the visual quality of decoded video data by removing blocking artifacts. Such high frequency data, however, can improve the quality of ALF. Thus, the techniques of this disclosure may improve coding efficiency without degrading video quality by using high frequency, pre-deblocked video data in the ALF process while still outputting deblock filtered video data.

Figure 1:
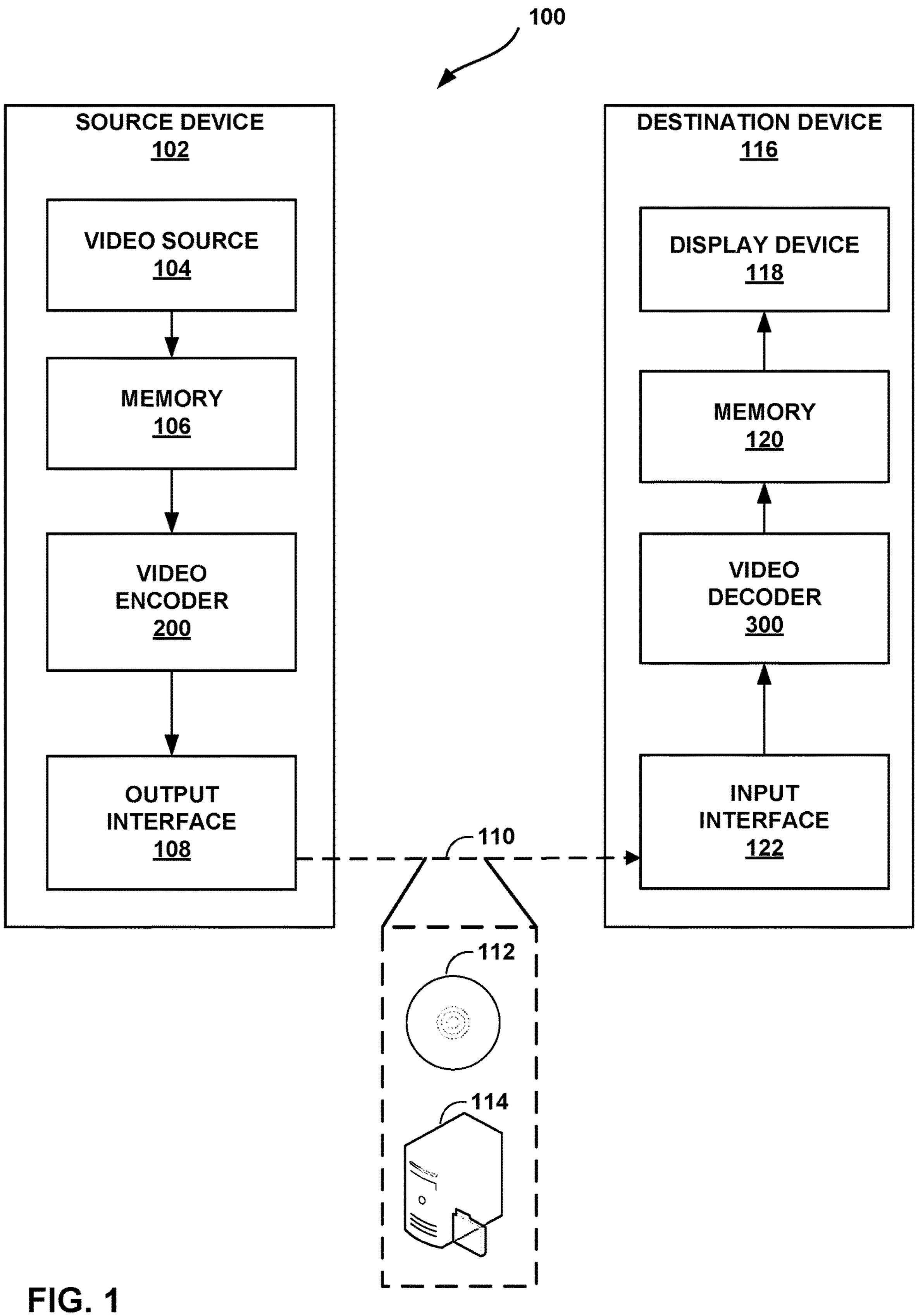
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the filtering techniques described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for filtering described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use loop filtering.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder

200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In video coding, such as in the H.266/VVC standard, ALF is applied to minimize the mean square error between filtered samples and original samples. ALF, as implemented in H.266/VVC, utilizes only samples after SAO filtering. That is, the input samples for ALF may, for example, be the output samples of SAO. The output samples of ALF may be stored in decoded picture buffer (DPB) or output as viewable pictures. The filter shapes for ALF that were adopted in the joint exploration model (JEM) software were 5×5, 7×7, and 9×9 diamond shapes. The filter shape can be selected and signaled at a picture level in JEM. To get a better trade-off between coding efficiency and filter complexity, in VVC, only 7×7 diamond shape and 5×5 diamond shape are supported for luma and chroma components, respectively.

Figure 2B:
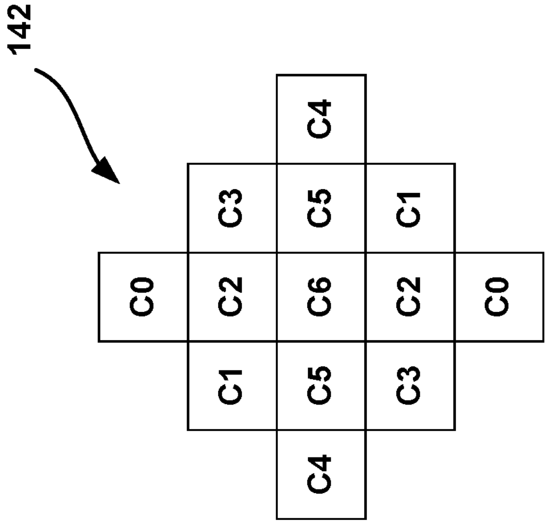
FIGS. 2A and 2B are conceptual diagram illustrating example adaptive loop filter (ALF) shapes that may be used in accordance with the techniques of this disclosure.
Figure 2A:
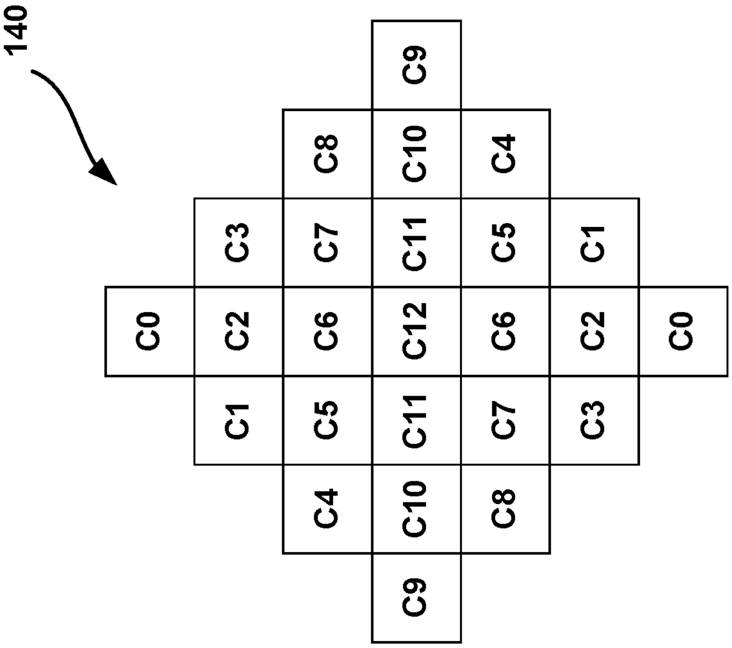

FIG. 2A shows an example filter 140, which is a 7×7 diamond shape filter. FIG. 2B shows an example filter 142, which is a 5×5 diamond shape filter. In each of filters 140 and 142, an integer coefficient $c_i$ is represented with 7-bit fractional precision. The absolute value of $c_i$ is coded by using a $0^{th}$ order Exp-Golomb code followed by a sign bit for a non-zero coefficient. In FIGS. 2A and 2B, each square corresponds to a luma or chroma sample, and the center square corresponds a current to-be-filtered sample. To reduce the overhead of sending coefficients and the number of multiplications, the filter shapes in FIGS. 2A and 2B are point-symmetrical. In addition, as shown in equation (1), the sum of all filter coefficients is set equal to 128, which is the fixed-point representation of 1.0 with 7-bit fractional precision.

$$2\sum_{i=0}^{N-2} c_i + c_{N-1} = 128 \quad (1)$$

In equation (1), N is the number of coefficients, with N being equal to 13 and 7 for 7×7 and 5×5 filter shapes, respectively.

In VVC, nonlinearity is introduced to ALF. A simple clipping function is applied to reduce the impact of a neighboring sample value when the difference between the neighboring sample value and a current to-be-filtered sample value is too large. To filter a sample, ALF may be performed as:

$$\tilde{R}(x,y) = R(x,y) + \left[\sum_{i=0}^{N-2} c_i(f_{i,0} + f_{i,1}) + 64\right] \gg 7 \quad (2)$$

where R(x, y) is a sample value after SAO.

The non-linear function is defined with a clipping functions as:

$$f_{i,j} = \min(b_i, \max(-b_i, R(x+x_{i,j}, y+y_{i,j}) - R(x,y))) \quad (3)$$

where j is equal to 0 or 1, and $(x_{i,j}, y_{i,j})$ are filter tap position offsets of ith coefficient $c_i$.

In VVC version 1, as shown in equation (4), the clipping parameter $b_i$ for a coefficient $c_i$, is determined by a clipping index $d_i$. BD is the internal bit depth.

$$b_i = \begin{cases} 2^{BD} & \text{when } d_i = 0 \\ 2^{BD-1-2d_i}, & \text{otherwise} \end{cases} \quad (4)$$

For a filter, both the number of signaled coefficients and the number of the signaled clipping index are N−1. Each coefficient is limited to the range of [−128, 127], which is equivalent to [−1.0, 1.0] with 7-bit fractional precision. Each clipping index $d_i$ can be 0, 1, 2 or 3 and is signaled by using a two-bit fixed length code. To simplify the clipping operation, as in equation (4), the value of a clipping parameter $b_i$ may be limited to only be a power of 2. Therefore, bit-wise logical operations can be applied as clipping operations.

Figure 3:
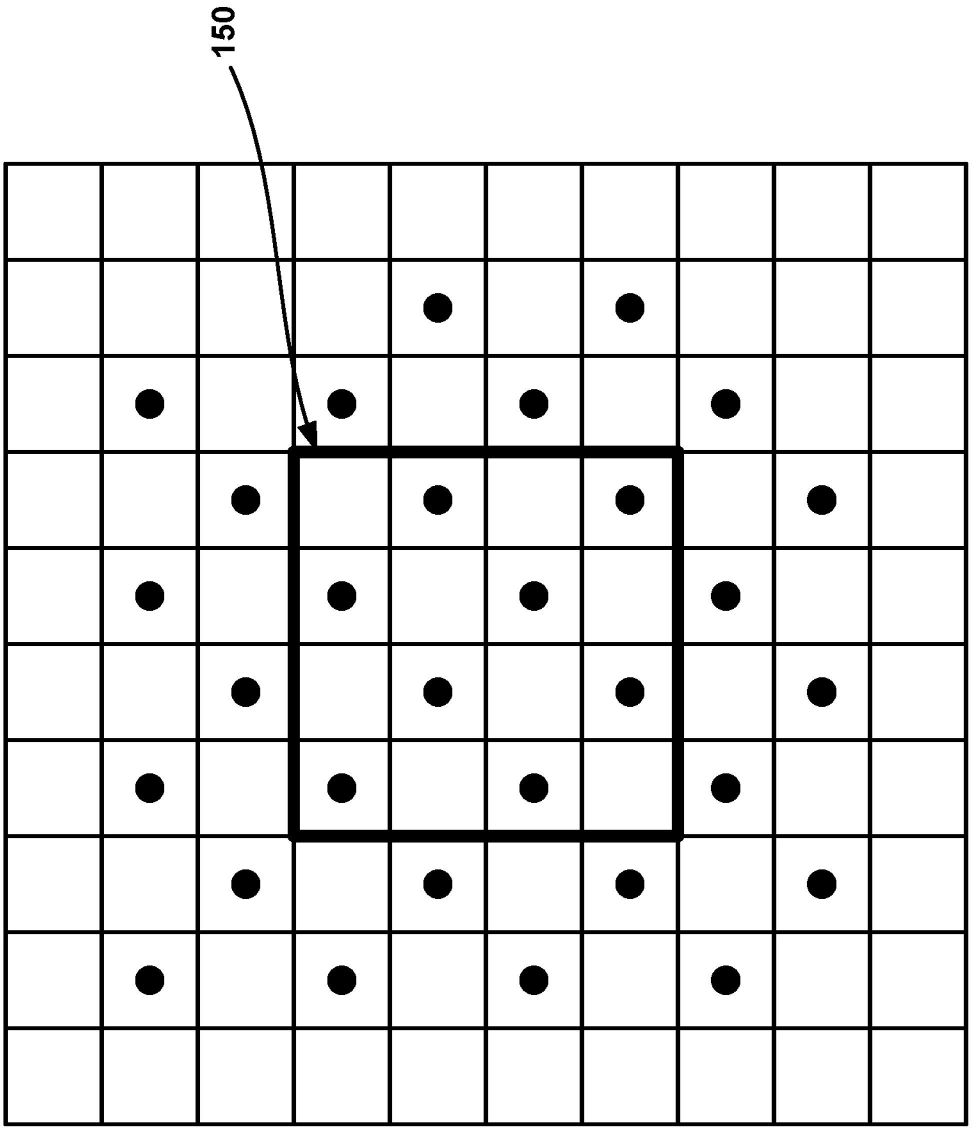
FIG. 3 is a conceptual diagram illustrating example sub-sampled Laplacian values for a 4×4 sub-block ALF classification that may be used in accordance with the techniques of this disclosure.

Video encoder 200 and video decoder 300 may be configured to perform sub-block level filter adaptation. In VVC version 1, ALF follows the same luma classification framework as ALF in JEM-7.0. To obtain a better trade-off between coding efficiency and calculation complexity, the block size for classification may be increased to 4×4 samples from 2×2 samples. To determine the class index of a 4×4 block, a surrounding window with 8×8 luma samples is employed to derive direction and activity information. In this 8×8 luma samples window, four gradient values of every second sample are first calculated, as shown in FIG. 3. FIG. 3 illustrates subsampled Laplacian values for a 4×4 sub-block 150 for ALF classification. Gradient values of samples marked with a dot are calculated. Gradient values of other samples are set to 0.

Figure 4:
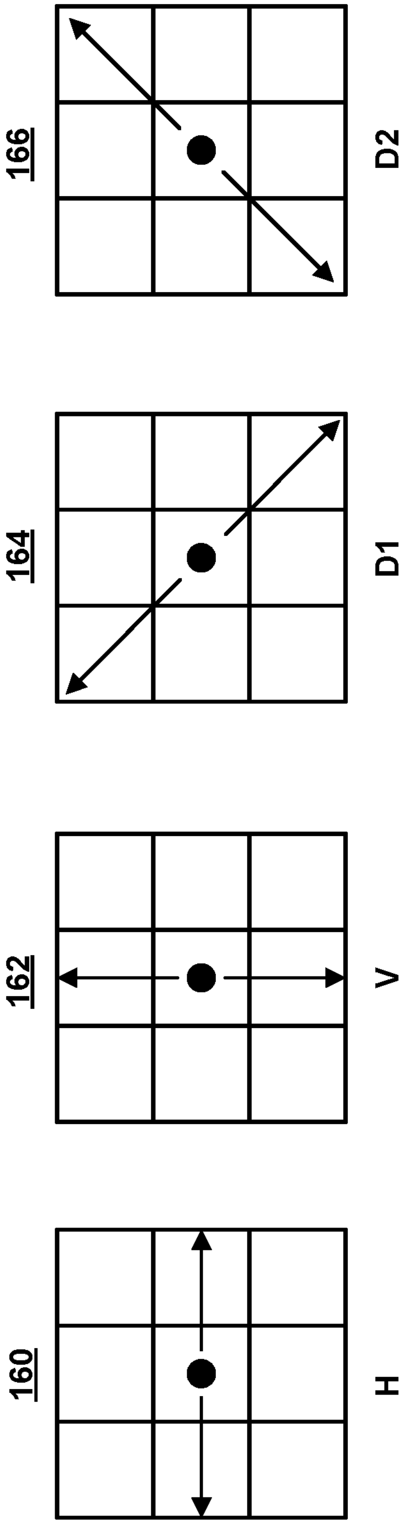
FIG. 4 is a conceptual diagram illustrating example Laplacian values for a luma sample that may be used in accordance with the techniques of this disclosure.

FIG. 4 illustrates the four gradient values for each sample with coordinates (k, l). The dot represents the sample for which the gradient is being calculated. Block 160 illustrates the horizontal gradient (H), and block 162 illustrates the vertical gradient (V). Block 164 illustrates the 135-degree gradient (D1), and block 166 illustrates the 45-degree gradient (D2). H, V, D1, and D2 are derived as follows:

$H_{k,l} = |2R(k,l) - R(k-1,l) - R(k+1,l)|$ $V_{k,l} = |2R(k,l) - R(k,l-1) - R(k,l+1)|$ $D1_{k,l} = |2R(k,l) - R(k-1,l-1) - R(k+1,l+1)|$ $D2_{k,l} = |2R(k,l) - R(k-1,l+1) - R(k+1,l-1)| \quad (5)$ Variables i and j can refer to the coordinates of the upper left sample in the 4×4 block. The summation of the calculated horizontal gradient $g_H$, the vertical gradient $g_V$, the 135-degree gradient $g_{D1}$, and the 45-degree gradient $g_{D2}$ is calculated as follows:

$$g_H=\sum_{k=i-2}^{i+5}\sum_{l=j-2}^{j+5}H_{k,l},\ g_V=\sum_{k=i-2}^{i+5}\sum_{l=j-2}^{j+5}V_{k,l} \tag{6}$$

$$g_{D1}=\sum_{k=i-2}^{i+5}\sum_{l=j-2}^{j+5}D1_{k,l},\ g_{D2}=\sum_{k=i-2}^{i+5}\sum_{l=j-2}^{j+5}D2_{k,l}$$

A ratio of the maximum and minimum of the horizontal and vertical gradients, denoted by $R_{H,V}$, and the ratio of maximum and minimum of the two diagonal gradients, denoted by $R_{D1,D2}$, are calculated as shown in equation (7).

$$R_{H,V}=\max(g_H,g_V)/\min(g_H,g_V)$$

$$R_{D1,D2}=\max(g_{D1},g_{D2})/\min(g_{D1},g_{D2}) \tag{7}$$

Then, $R_{H,V}$ and $R_{D1,D2}$ are compared to each other with two thresholds $t_1=2$ and $t_2=4.5$ to derive the directionality D:

Step 1: If both $R_{H,V}\le t_1$ and $R_{D1,D2}\le t_1$, D is set to 0 (texture), otherwise continue with Step 2.

Step 2: If $R_{D1,D2}>R_{H,V}$, continue with Step 3, otherwise continue with Step 4.

Step 3: If $R_{D1,D2}\le t_2$, D is set to 1 (weak diagonal), otherwise, D is set to 2 (strong diagonal).

Step 4: If $R_{H,V}\le t_2$, D is set to 3 (weak horizontal/vertical), otherwise, D is set to 4 (strong horizontal/vertical).

The activity value A is calculated as follows:

$$A=\left(\sum_{k=i-2}^{i+5}\sum_{l=j-2}^{j+5}(V_{k,l}+H_{k,l})\right)\gg(BD-2) \tag{8}$$

Figure 5:
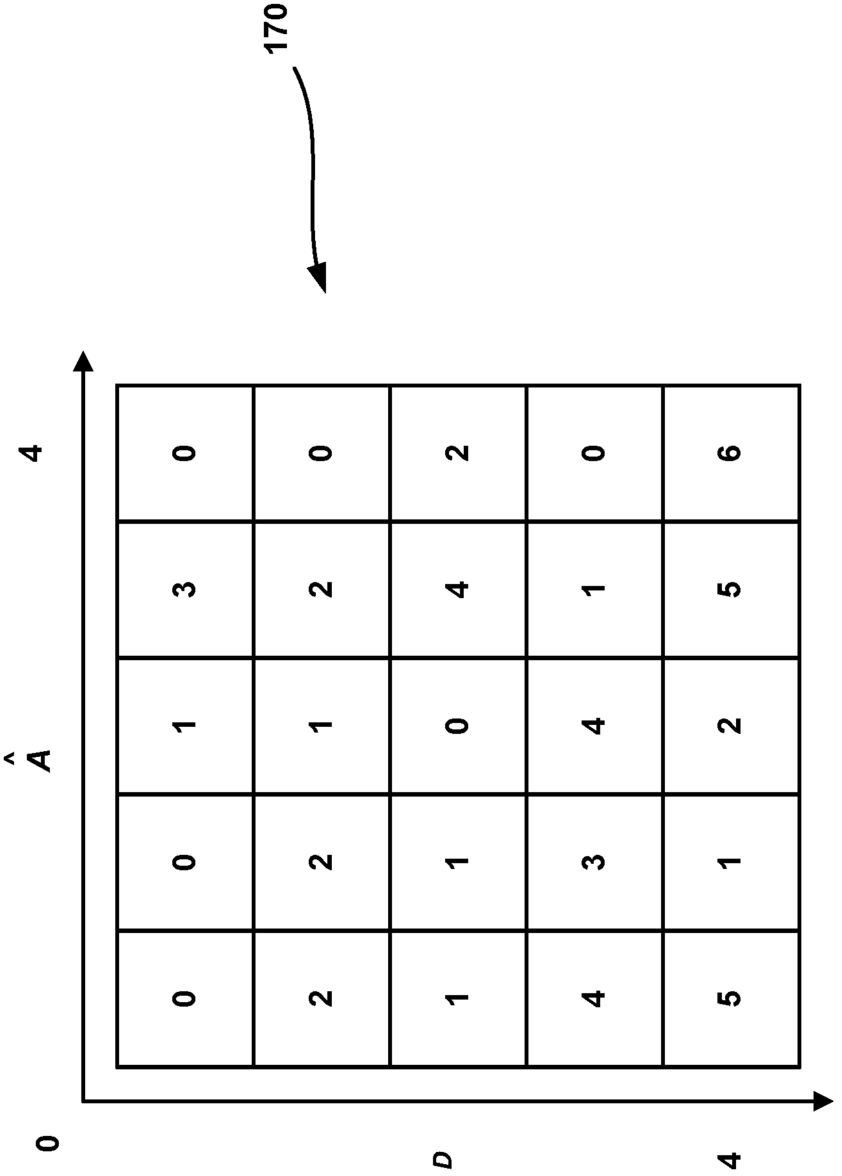
FIG. 5 is a conceptual diagram illustrating an example of ALF class merging that may be used in accordance with the techniques of this disclosure.

FIG. 5 shows an example of merging 25 luma classes into 7 merged classes (0 to 6), where each square represents a class based on the values of D and Â. 5×5 grid 170 represents the 25 classes, with the numbers inside each box of 5×5 grid 170 representing the merged class from 0 to 6. Each class, i.e., each square in 5×5 grid 170, can have an index from 0 to 24 inclusive. A is mapped to the range of 0 to 4 inclusive, and the quantized value is denoted as Â. Therefore, each 4×4 block is categorized into one of the 25 classes as follows:

$$C=5D+\hat{A} \tag{9}$$

A luma filter set contains 25 filters. However, to reduce the number of bits required to represent the filter coefficients while maintaining the coding efficiency, different classes can be merged, with the merged classes using the same filters. A merging table is signaled. In the merging table, a filter index for each class is signaled, for example, using a fixed-length code. In the example filter set for FIG. 5, 7 luma filters are signaled. For each class, the filter index (from 0 to 6 in this example) is signaled in an ALF_APS.

After determining a filter from a luma filter set based on class index C of a 4×4 block and the merging table, before filtering the samples of the 4×4 block, a geometric transformation may be applied to the filter depending on gradient values calculated for the 4×4 block as illustrated in Table 1.

TABLE 2

Geometric transformation based on gradient values

| Gradient values | Transformation |
|---|---|
| $g_{D2} < g_{D1}$ and $g_H < g_V$ | No transformation |
| $g_{D2} < g_{D1}$ and $g_V \le g_H$ | Diagonal flip |
| $g_{D1} \le g_{D2}$ and $g_H < g_V$ | Vertical flip |
| $g_{D1} \le g_{D2}$ and $g_V \le g_H$ | Right rotation |

Figure 6:
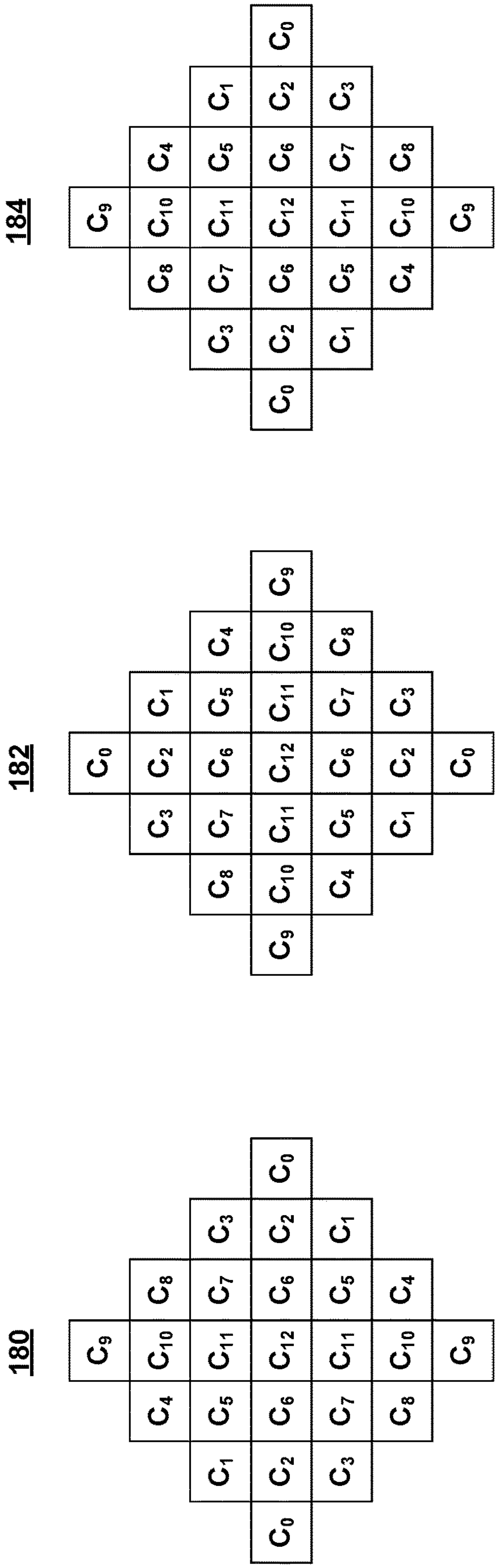
FIG. 6 is a conceptual diagram illustrating example geometric transformations of 7×7 diamond filter shapes that may be used in accordance with the techniques of this disclosure.

FIG. 6 shows examples of geometric transformations of filter 140 in FIG. 2A. As can be seen in FIG. 6, filter 180 corresponds to a diagonal flip of filter 140. Filter 182 corresponds to a vertical flip of filter 140, and filter 184 corresponds to a right rotation of filter 140.

Video encoder 200 and video decoder 300 may be configured to perform coding tree block level adaptation. In JEM-7.0, only one luma filter set is applied to all luma CTBs of a slice, and only one chroma filter is applied to all chroma CTBs of a slice. However, there are two potential disadvantages. First, when statistic information among CTBs differs by a certain amount, using the same filter or filter set for all CTBs of a color component may limit the coding efficiency of ALF, especially for large-resolution sequences and mixed-content video sequences. Second, when deriving a filter for a slice, a filter cannot be calculated until the statistic information of the entire slice is collected. This multiple-pass coding is not friendly for low-delay applications. To address this problem, one solution is to use statistics from previous coded slices. However, this may result in some performance loss.

In addition to luma 4×4 block level filter adaptation, VVC supports CTB level filter adaption. In a slice, different luma CTBs are allowed to use different luma filter sets, and different chroma CTBs are able to use different chroma filters. CTBs with similar statistics may use the same filters. This CTB level filter adaptation improves coding efficiency, especially for low-delay applications. Additionally, VVC version 1 allows filters from previously coded pictures to be used for CTBs. This temporal filter re-usage mechanism can reduce the overhead of filter coefficient signaling. In VVC version 1, up to seven signaled luma filter sets and eight signaled chroma filters can be applied to a slice. When there are not any signaled filters, one of 16 fixed filter sets can be applied to a luma CTB. When ALF is enabled, the filter set index of either a fixed filter set or a signaled luma filter set is signaled for a luma CTB. The filter index of a signaled chroma filter is signaled for a chroma CTB. By using filters signaled from previously coded pictures and fixed filters, when encoding a current CTU in a low delay application, three CTU-level on/off flags and a filter/filter set index can be determined by only using the statistic information of a current CTU. Therefore, the encoded bitstream of each CTU can be generated on the fly and without waiting for the availability of the statistics of the whole picture.

Video encoder 200 and video decoder 300 may be configured to perform techniques for line buffer reduction. As shown in FIGS. 2A and 2B, in the vertical direction, the filter shapes have 7 taps and 5 taps for luma and chroma components, respectively. As a result, in VVC Test Model 2.0 (VTM-2.0), when decoding a row of CTUs, due to the delay of the deblocking filter and SAO filter, 7 luma lines and 4 chroma lines of the upper CTU row must be stored in a line buffer for ALF. However, the extra line buffers require large chip areas, especially for high-definition (HD) and ultra-high-definition (UHD) video sequences.

To make ALF hardware friendly (e.g., by reducing line buffer requirements), the concept of a virtual boundary (VB)

may be applied to remove all the line buffer overhead for ALF. Considering the deblocking filter and SAO filter in VVC version 1, the position of a VB is 4 luma samples and 2 chroma samples above a horizontal CTU boundary. When one sample on one side of a VB is filtered, the samples on the other side of the VB cannot be utilized, and modified filtering with symmetrical sample padding may be applied.

Figure 7A:
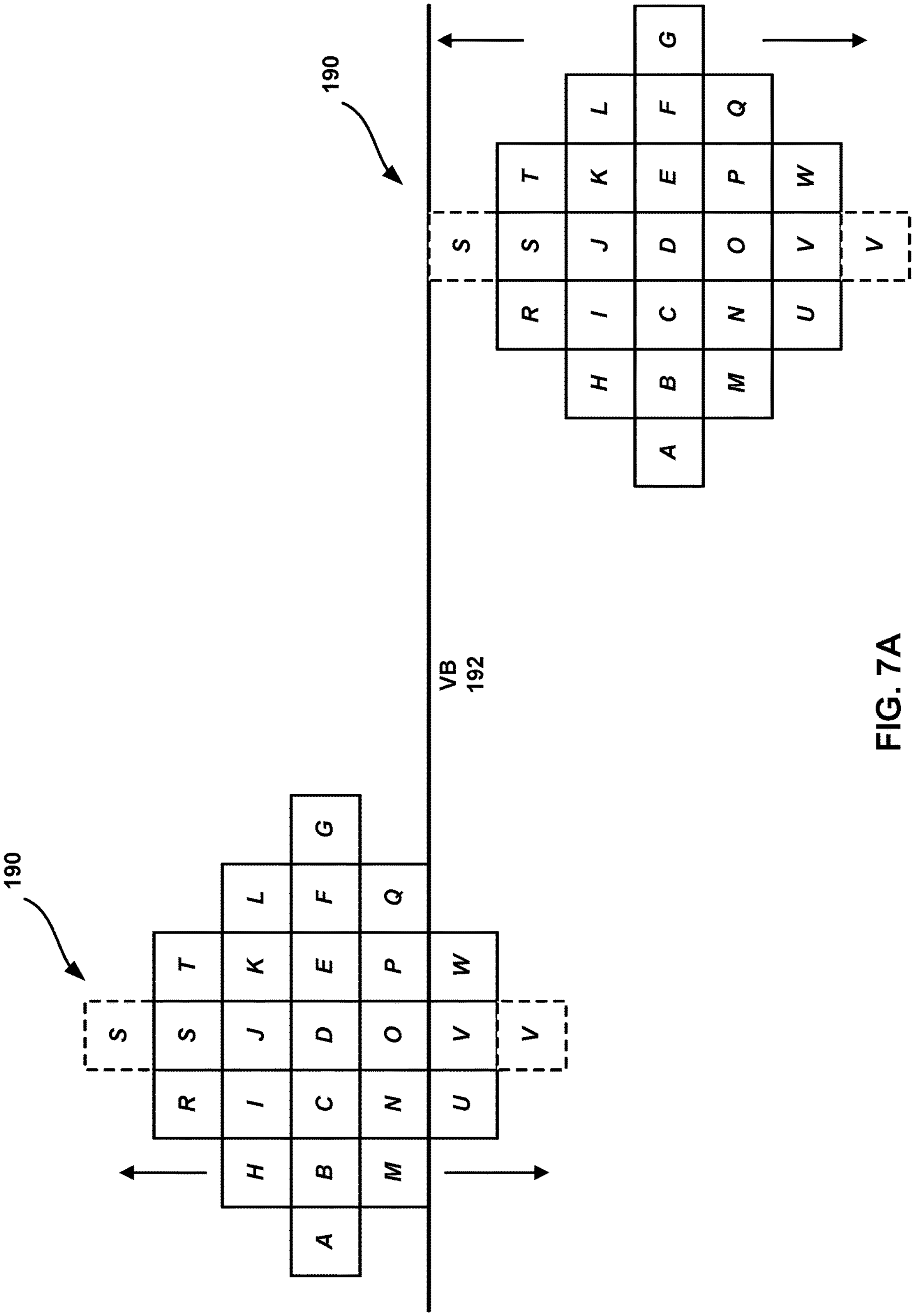
FIGS. 7A-7C show examples of symmetrical sample padding in ALF that may be used in accordance with the techniques of this disclosure.
Figure 7B:
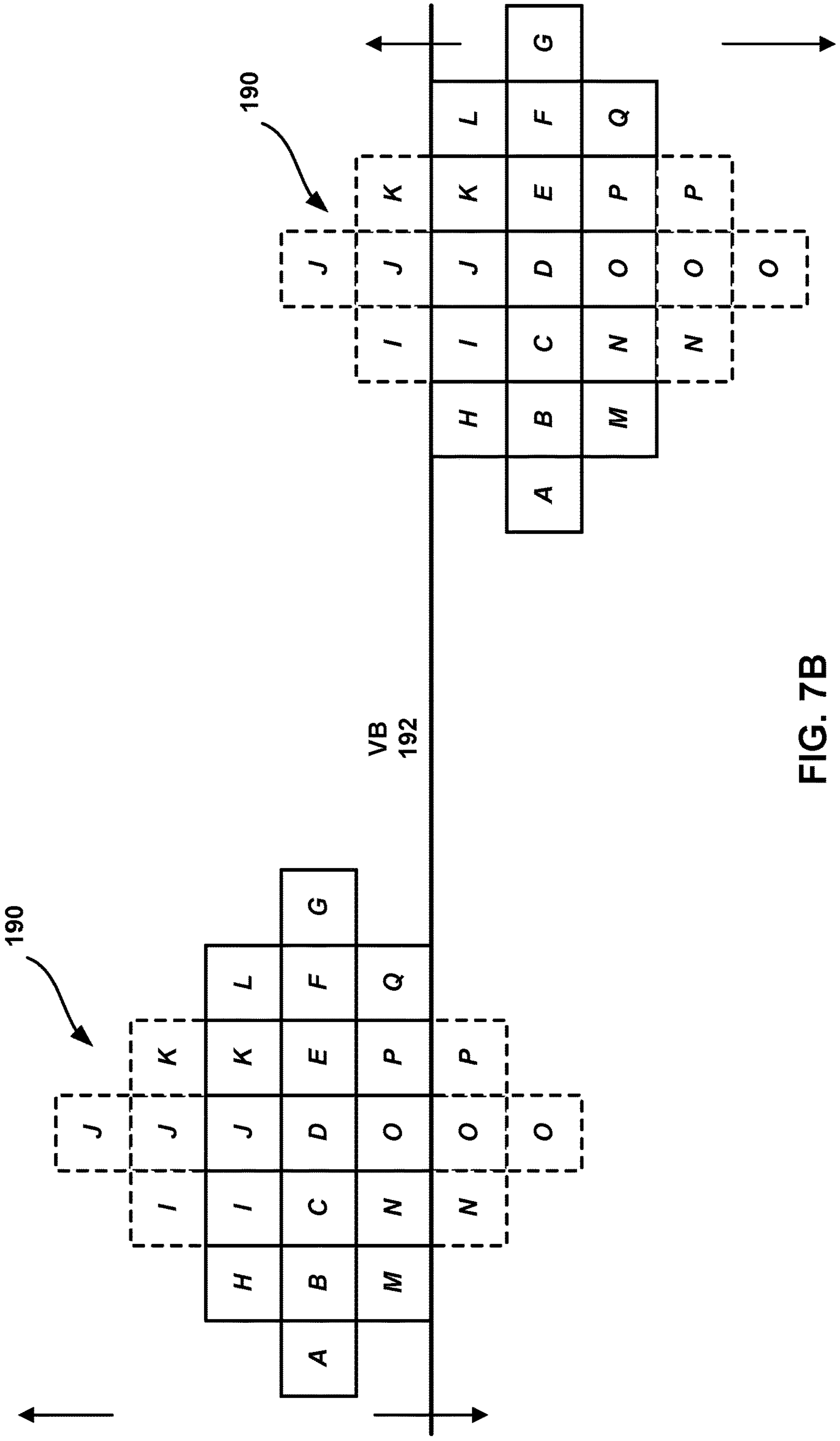
Figure 7C:
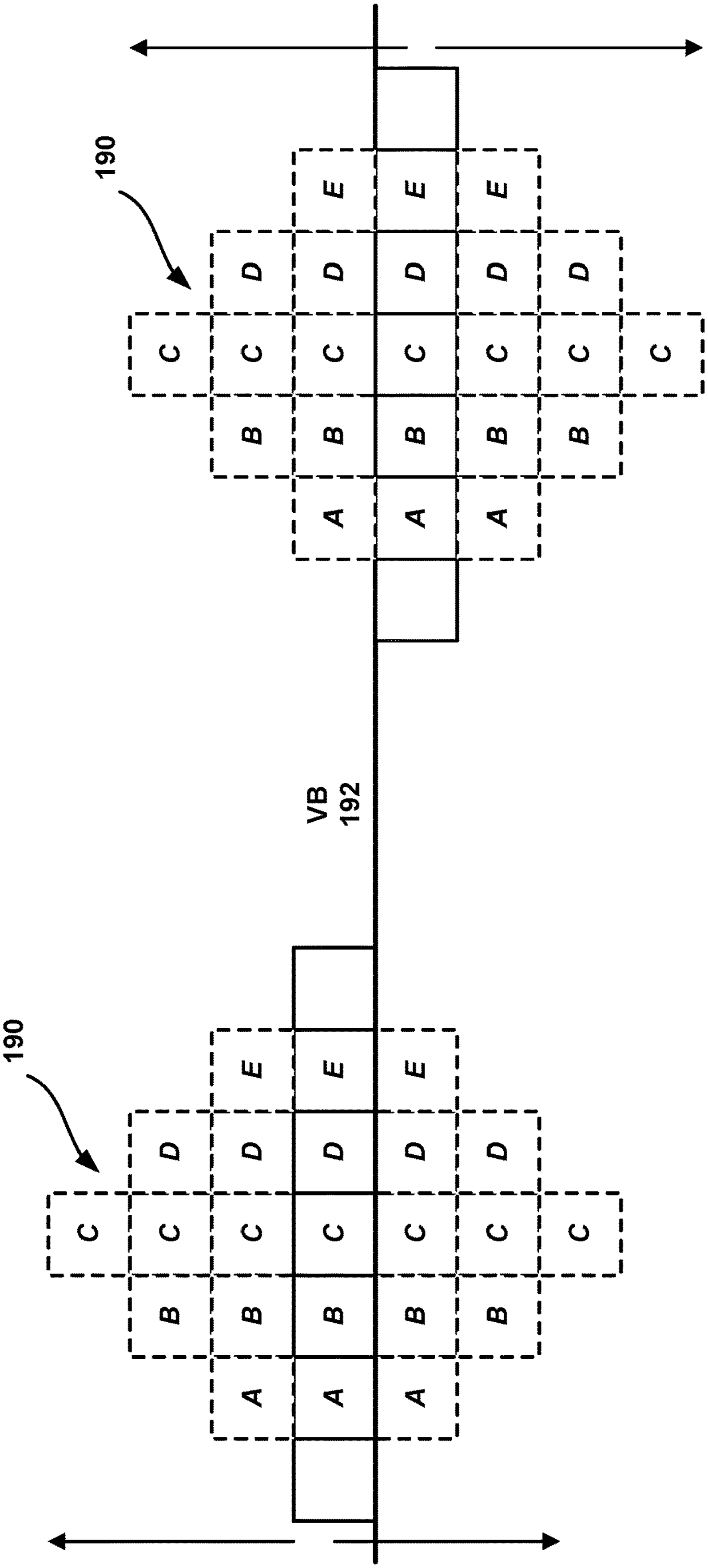

FIGS. 7A-7C show examples of symmetrical sample padding for luma ALF filtering at an ALF VB. In the examples of FIGS. 7A-7C, the center square of filter 190 is the position of a current, to-be-filtered sample, and the bold line is the position of a VB (VB 192). In FIGS. 7A-7C, the filter tap locations with dashed lines are padded. FIG. 7A shows an example where one filter tap location of filter 190 is above or below VB 192. In this example, one filter tap location is padded. FIG. 7B shows an example where four filter tap locations of filter 190 are above or below VB 192. In this example, four filter tap locations are padded.

However, when a sample is on the closest row on each side of VB 192, as shown in FIG. 7C, the 2D filter is equivalent to a horizontal filter. This may introduce visual artifacts. To address this problem, the filter strength may be compensated when the current, to-be-filtered sample is located on the closest row on each side of a VB, as shown in equation (10). Comparing equation (10) with equation (2), it can be seen that 3 more bits are right shifted.

$$\tilde{R}(x, y) = R(x, y) + \left[\sum_{i=0}^{N-2} c_i(f_{i,0} + f_{i,1}) + 512\right] \gg 10 \tag{10}$$

When VB processing is applied, the classification of a 4×4 block may also be modified. When calculating the class index of a 4×4 block on one side of a VB, the gradients and samples on the other side of the VB may not be used, as shown in FIG. 8.

Figure 8:
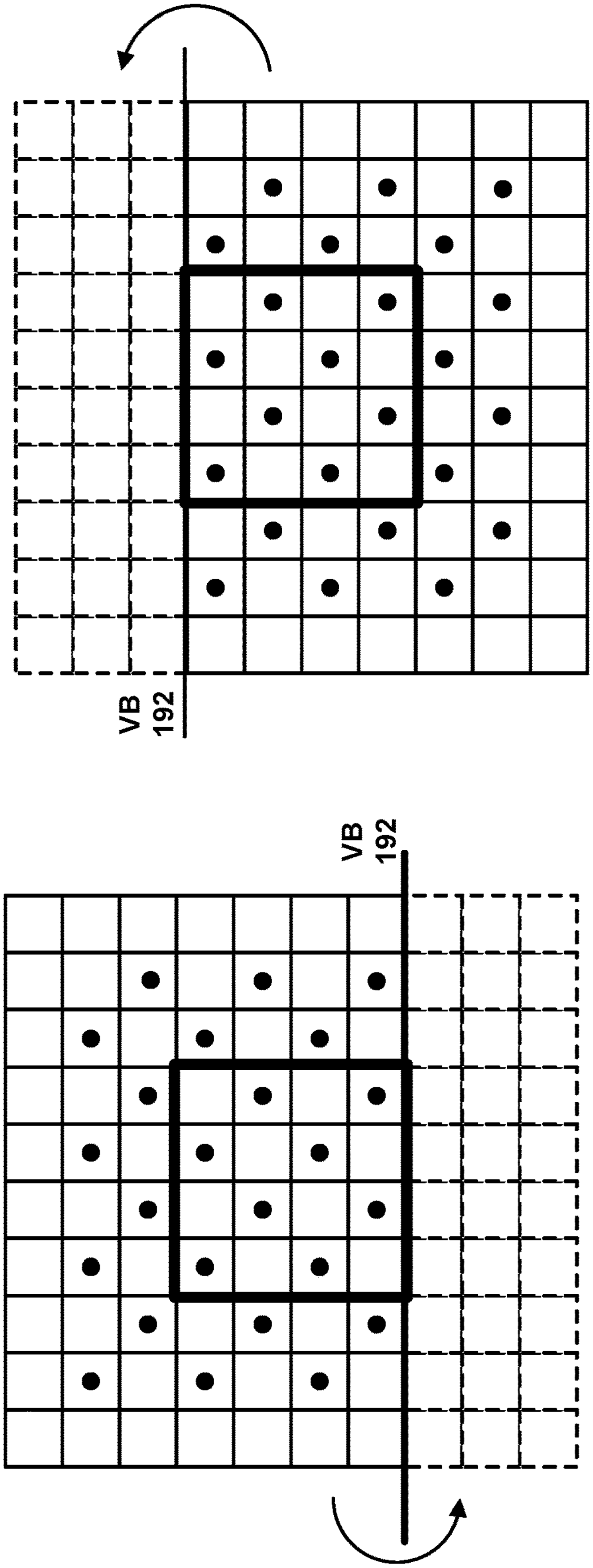
FIG. 8 shows an example of ALF 4×4 sub-block classification that may be used in accordance with the techniques of this disclosure.

FIG. 8 shows an example of ALF 4×4 sub-block classification at an ALF VB. When calculating gradient values of samples adjacent to a VB, the samples on the other side of the VB cannot be utilized. Therefore, the boundary samples of the current side are repetitively extended, as shown in FIG. 8. That is, the boundary samples on the current side of the VB are mirrored to the other side of the VB. As the number of available gradient values is reduced, the activity derivation in equation (8) is re-scaled to:

$$A = \left(\sum_{k=i-2}^{i+5} \sum_{l=j-2}^{j+5} (V_{k,l} + H_{k,l}) * 3\right) \gg (BD - 1) \tag{11}$$

Video encoder 200 and video decoder 300 may be configured to perform filter coefficient signaling. In VVC version 1, ALF coefficients are signaled in ALF adaptation parameter sets (APS). One APS may contain one set of luma filters with up to 25 filters, up to 8 chroma filters and up to 8 cross-component ALF (CC-ALF) filters. Each set of luma filters support applying ALF to the luma 25 classes. In VVC version 1, up to 8 ALF_APSs are supported.

Table 2 below shows an example syntax signal table for signaling filter coefficients in accordance with the techniques of this disclosure.

TABLE 2

| alf_data( ) { | Descriptor |
|---|---|
| alf_luma_filter_signal_flag | u(1) |
| if( aps_chroma_present_flag ) { | |
| alf_chroma_filter_signal_flag | u(1) |
| alf_cc_cb_filter_signal_flag | u(1) |
| alf_cc_cr_filter_signal_flag | u(1) |
| } | |
| if( alf_luma_filter_signal_flag ) { | |
| alf_luma_clip_flag | u(1) |
| alf_luma_num_filters_signalled_minus1 | ue(v) |
| if( alf_luma_num_filters_signalled_minus1 > 0 ) | |
| for( filtIdx = 0; filtIdx < NumAlfFilters; filtIdx++ ) | |
| alf_luma_coeff_delta_idx[ filtIdx ] | u(v) |
| for( sfIdx = 0; sfIdx <= alf_luma_num_filters_signalled_minus1; sfIdx++ ) | |
| for( j = 0; j < 12; j++ ) { | |
| alf_luma_coeff_abs[ sfIdx ][ j ] | ue(v) |
| if( alf_luma_coeff_abs[ sfIdx ][ j ] ) | |
| alf_luma_coeff_sign[ sfIdx ][ j ] | u(1) |
| } | |
| if( alf_luma_clip_flag ) | |
| for( sfIdx = 0; sfIdx <= alf_luma_num_filters_signalled_minus1; sfIdx++ ) | |
| for( j = 0; j < 12; j++ ) | |
| alf_luma_clip_idx[ sfIdx ][ j ] | u(2) |
| } | |
| if( alf_chroma_filter_signal_flag ) { | |
| alf_chroma_clip_flag | u(1) |
| alf_chroma_num_alt_filters_minus1 | ue(v) |
| for( altIdx = 0; altIdx <= alf_chroma_num_alt_filters_minus1; altIdx++ ) { | |
| for( j = 0; j < 6; j++ ) { | |
| alf_chroma_coeff_abs[ altIdx ][ j ] | ue(v) |
| if( alf_chroma_coeff_abs[ altIdx ][ j ] > 0 ) | |
| alf_chroma_coeff_sign[ altIdx ][ j ] | u(1) |
| } | |
| if( alf_chroma_clip_flag ) | |
| for( j = 0; j < 6; j++ ) | |

TABLE 2-continued

```
alf_data( ) {                                                              Descriptor
            alf_chroma_clip_idx[ altIdx ][ j ]                             u(2)
      }
   }
   if( alf_cc_cb_filter_signal_flag ) {
      alf_cc_cb_filters_signalled_minus1                                   ue(v)
      for( k = 0; k < alf_cc_cb_filters_signalled_minus1 + 1; k++ ) {
         for( j = 0; j < 7; j++ ) {
            alf_cc_cb_mapped_coeff_abs[ k ][ j ]                           u(3)
            if( alf_cc_cb_mapped_coeff_abs[ k ][ j ] )
               alf_cc_cb_coeff_sign[ k ][ j ]                              u(1)
         }
      }
   }
   if( alf_cc_cr_filter_signal_flag ) {
      alf_cc_cr_filters_signalled_minus1                                   ue(v)
      for( k = 0; k < alf_cc_cr_filters_signalled_minus1 + 1; k++ ) {
         for( j = 0; j < 7; j++ ) {
            alf_cc_cr_mapped_coeff_abs[ k ][ j ]                           u(3)
            if( alf_cc_cr_mapped_coeff_abs[ k ][ j ] )
               alf_cc_cr_coeff_sign[ k ][ j ]                              u(1)
         }
      }
   }
}
```

Figure 9:
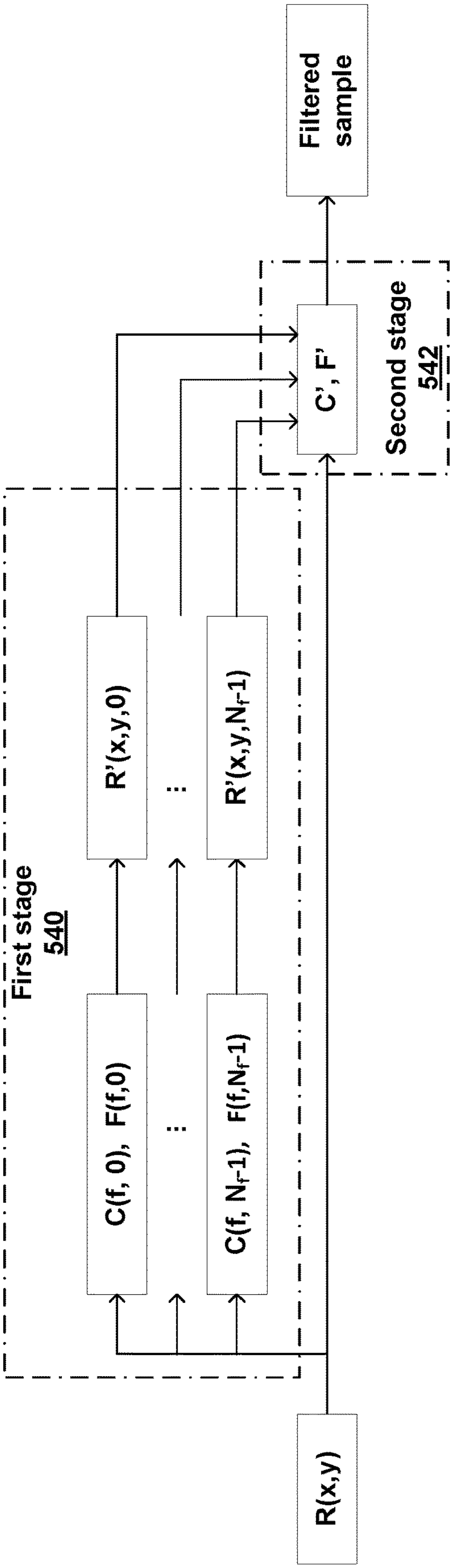
FIG. 9. shows and example ALF framework that uses multiple classifiers.

Video encoder 200 and video decoder 300 may be configured to perform ALF using multiple classifiers. In VVC, when filtering a sample, only one classifier and one filter can be applied. To improve ALF's performance on top of VVC, an ALF framework based on multiple classifiers has been proposed. An example implementation of such framework is shown in FIG. 9. When filtering a sample, as shown in FIG. 9, multiple classifiers are applied. A filter is applied to the sample corresponding to a classifier. In FIG. 9, there are two stages. First (first stage 540), a pre-filtering stage includes filter set F(f, i) with i=0 . . . $N_f$−1 and the classifier C(f, i) with i=0 . . . $N_f$−1 of the ith fixed filter set. Secondly (second stage 542), a final-filtering stages includes a signaled filter or a predefined filter set F', and the corresponding classifier C'.

Figure 10:
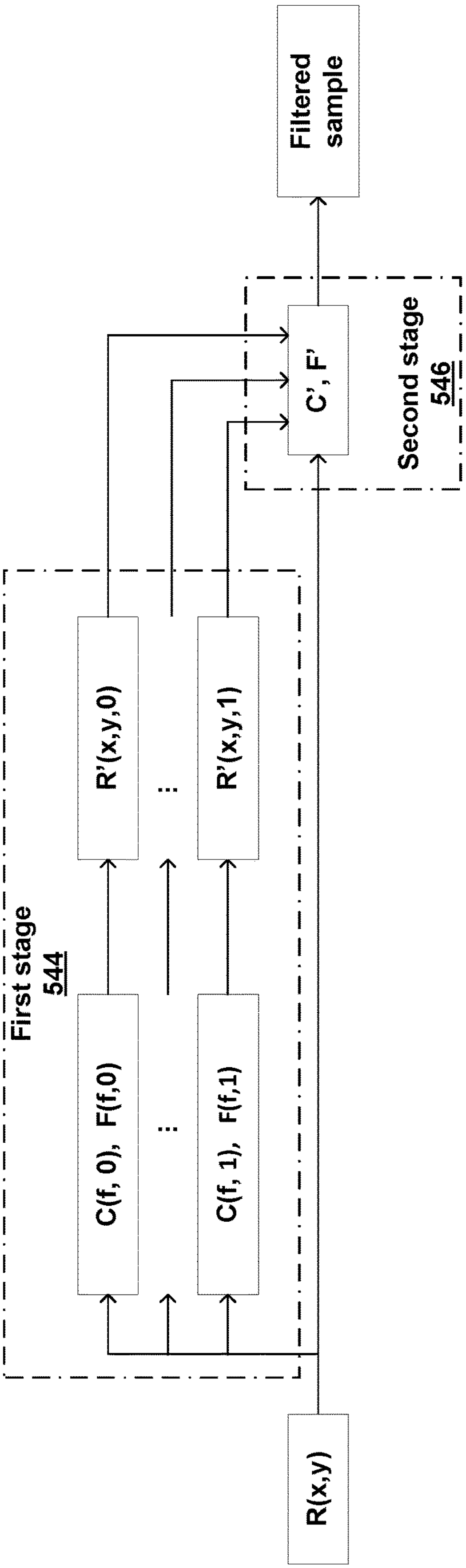
FIG. 10. shows an example ALF framework with three classifiers.

FIG. 10 shows an example ALF framework with three classifiers. In this regard, the ALF framework of FIG. 10 represents a specific implementation of the generalized ALF framework described with respect to FIG. 9. In the example of FIG. 10, which is adopted in ECM-1.0, $N_f$=2. In FIG. 10, there are two stages. First (first stage 544), a pre-filtering stage includes filter set F(f, i) with i=0 . . . $N_f$−1 and the classifier C(f, i) with i=0 . . . $N_f$−1 of the ith fixed filter set. Secondly (second stage 546), a final-filtering stages includes a signaled filter or a predefined filter set F', and the corresponding classifier C'.

In ECM-1.0, in a classifier C(f, i) with i=0 or 1, activity and direction values maybe determined based on 2-D Laplacian values. The classifier may be applied to each sample or a block. When a classifier is applied to a block, all samples in the block have the same class index and the same transpose type. Let $w_i$ denote the width of a block, hi denote height of the block and (x, y) denote the coordinates of the top-left sample of the block.

For a sample with coordinates (k, l), four Laplacian (gradient) values: horizontal gradient H, vertical gradient V, 135-degree gradient D1 and 45-degree gradient D2 may derived as $$H_{k,l}=|2R(k,l)-R(k-1,l)-R(k+1,l)|$$

$$V_{k,l}=|2R(k,l)-R(k,l-1)-R(k,l+1)|$$

$$D1_{k,l}=|2R(k,l)-R(k-1,l-1)-R(k+1,l+1)|$$

$$D2_{k,l}=|2R(k,l)-R(k-1,l+1)-R(k+1,l-1)| \quad (12)$$

Like VVC, the activity value $A_i$ may be derived by using vertical and horizontal gradients as:

$$A_i=\left(\sum_{k=x-a_i}^{x+w_i+a_i-1}\sum_{l=y-b_i}^{y+h_i+b_i-1}(V_{k,l}+H_{k,l})\right) \quad (13)$$

where $a_i$ and $b_i$ are the window sizes in horizontal and vertical directions for classifier C(f, i), respectively.

$A_i$ is further quantized to the range of 0 to $M_{A,i}$−1 inclusively, and the quantized value is denoted as $\hat{A}_i$.

$M_{A,i}$=16, $A_i$=min(192, ($mult_i \cdot A_i$)>>(9+bitdepth)) and $\hat{A}$=Q[$A_i$], wherein one example:

$M_{A,i}$=16, $A_i$=min(192, ($mult_i \cdot A_i$) (9+bitdepth)) and $\hat{A}_i$=Q[$A_1$], where Q[193]={0, 1, 2, 3, 4, 4, 5, 5, 6, 6, 6, 6, 7, 7, 7, 7, 8, 8, 8, 8, 8, 8, 8, 8, 9, 9, 9, 9, 9, 9, 9, 9, 10, 10, 10, 10, 10, 10, 10, 10, 10, 10, 10, 10, 10, 10, 10, 11, 11, 11, 11, 11, 11, 11, 11, 11, 11, 11, 11, 11, 11, 11, 11, 12, 12, 12, 12, 12, 12, 12, 12, 12, 12, 12, 12, 12, 12, 12, 12, 12, 12, 12, 12, 12, 12, 12, 12, 12, 12, 12, 12, 12, 12, 12, 12, 12, 13, 13, 13, 13, 13, 13, 13, 13, 13, 13, 13, 13, 13, 13, 13, 13, 13, 13, 13, 13, 13, 13, 13, 13, 13, 13, 13, 13, 13, 13, 13, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 14, 15};

bitdepth is the bit depth of R(x, y), $mult_i$ is dependant on the window size ($a_i$,$b_i$) and $mult_i$ is equal to the following values:

| $a_i$ | $b_i$ | $mult_i$ |
|---|---|---|
| 0 | 0 | 5628 |
| 1 | 1 | 1407 |

-continued

| $a_i$ | $b_i$ | $mult_i$ |
|---|---|---|
| 2 | 2 | 624 |
| 3 | 3 | 351 |
| 4 | 4 | 225 |
| 5 | 5 | 156 |

Direction may be calculated by using horizontal gradient H, vertical gradient V, 135-degree gradient D1 and 45-degree gradient D2.

At first, values of horizontal gradient $g_{i,H}$, vertical gradient $g_{i,V}$, and two diagonal gradients, $g_{i,D1}$ and $g_{i,D2}$, are calculated as $$g_{i,H} = \sum_{k=x-a_i}^{x+w_i+a_i-1} \sum_{l=y-b_i}^{y+h_i+b_i-1} H_{k,l},\ g_{i,V} = \sum_{k=x-a_i}^{x+w_i+a_i-1} \sum_{l=y-b_i}^{y+h_i+b_i-1} V_{k,l},$$
$$g_{i,D1} = \sum_{k=x-a_i}^{x+w_i+a_i-1} \sum_{l=y-b_i}^{y+h_i+b_i-1} D1_{k,l},\ g_{i,D2} = \sum_{k=x-a_i}^{x+w_i+a_i-1} \sum_{l=y-b_i}^{y+h_i+b_i-1} D2_{k,l}, \quad (14)$$

To assign the directionality $D_i$, the maximum and minimum of the horizontal and vertical gradients, the maximum and minimum of the two diagonal gradients are derived as $$g_{i,h,v}^{max}=\max(g_{i,H},g_{i,V}),g_{i,h,v}^{min}=\min(g_{i,H},g_{i,V})$$

$$g_{i,D1,D2}^{max}=\max(g_{i,D1},g_{i,D2}),g_{i,D1,D2}^{min}(g_{i,D1},g_{i,D2}) \quad (15)$$

Edge strengths of horizontal/vertical directions ($ES_{i,HV}$) is calculated by comparing the ratio $g_{i,h,v}^{max}/g_{i,h,v}^{min}$ to an array of thresholds (Th). Let the size of the array of thresholds is S, and the thresholds are sorted ascendingly. The number of directions is $M_{D,i}$=(S+1)*(S+2)

Step 1. Initialize m=0 and $ES_{i,HV}$=0;

Step 2. If m is equal to S, stop; otherwise, go to Step 3.

Step 3. if $g_{i,h,v}^{max}/g_{i,h,v}^{min}$>Th[m], m=m+1 and $ES_{i,HV}=ES_{i,HV}+1$, go to Step 2; otherwise, stop.

A diagonal direction directions ($E_{i,D}$) is calculated similarly as

Step 1. Initialize m=0 and $E_{i,D}$=0;

Step 2. If m is equal to S, stop; otherwise, go to Step 3.

Step 3. if $g_{i,D1,D2}^{max}/g_{i,D1,D2}^{min}$>Th[m], m=m+1 and $E_{i,D}=E_{i,D}+1$, go to Step 2; otherwise, stop.

An example of the array of thresholds is Th=[1.25, 1.5, 2, 3, 4.5, 8] and S=6.

A major edge strength ($ES_M$) and a secondary edge strength ($ES_S$) may be determined as follows:

If $g_{i,h,v}^{max}/g_{i,h,v}^{min}>g_{i,D1,D2}^{max}/g_{i,D1,D2}^{min}$, $ES_M$ is set as $ES_{HV}$ and $ES_S$ is set as $ES_D$; otherwise, $ES_M$ is set as $ES_D$ and $ES_S$ is set as $ES_{HV}$ If $ES_S$ is larger than $ES_M$, $D_i$ is set to 0. Otherwise, if $g_{i,h,v}^{max}/g_{i,h,v}^{min}>g_{i,D1,D2}^{max}/g_{i,D1,D2}^{min}$, $D_i=ES_M*(ES_M+1)/2+ES_S$; else, $D_i=ES_M*(ES_M+1)/2+ES_S+M_{D,i}/2$ Class index $C_i$ may be derive as $C_i=\hat{A}_i*M_{D,i}+D_i$ Based on $C_i$, a filter from C(f, i) is picked.

Second Stage

In the second stage, F' is a signaled filter or a predefined filter set and C' is the corresponding classifier. The intermediate filtered results may be further filtered with current sample and/or its neighbors. C' may be used to determine which filter in F' is applied and how to transpose the coefficients.

C' may use the R and/or R' to determine the filter index for filter set F' by calculating activity and directions as the first stage. A transpose operation may be applied when applying F'.

In one example, for a sample with coordinates (k, l), four Laplacian (gradient) values: horizontal gradient H, vertical gradient V, 135-degree gradient D1 and 45-degree gradient D2 may derived as:

$$H_{k,l}=|2R(k,l)-R(k-1,l)-R(k+1,l)|$$

$$V_{k,l}=|2R(k,l)-R(k,l-1)-R(k,l+1)|$$

$$D1_{k,l}=|2R(k,l)-R(k-1,l-1)-R(k+1,l+1)|$$

$$D2_{k,l}=|2R(k,l)-R(k-1,l+1)-R(k+1,l-1)| \quad (16)$$

Like VVC, the activity value A may be derived by using vertical and horizontal gradients as:

$$A = \left( \sum_{k=x-a}^{x+w+a-1} \sum_{l=y-b}^{y+h+b-1} (V_{k,l} + H_{k,l}) \right) \quad (17)$$

where a and b are the window sizes in horizontal and vertical directions for classifier C' respectively and w and h are the width and height of a block where all samples have the same classification index the same transpose index.

A is further quantized to the range of 0 to $M_A-1$ inclusively, and the quantized value is denoted as $\hat{A}$. For example, $$A=\min(15,(\text{mult}\cdot A)>>(9+\text{bitdepth})) \text{ and } \hat{A}=Q[A], \text{ where } Q=\{0,1,2,2,2,2,2,3,3,3,3,3,3,3,3,4\} \quad (18)$$

bitdepth is the bit depth of R(x, y), mult may be dependent on the window size a*b and mult may be equal to the following values:

| a | b | mult |
|---|---|---|
| 0 | 0 | 5628 |
| 1 | 1 | 1407 |
| 2 | 2 | 624 |
| 3 | 3 | 351 |
| 4 | 4 | 225 |
| 5 | 5 | 156 |

Filtering:

After getting the class index of a sample from C', a filter from the filter set F' is chosen based on the class index. The filtering may be applied as:

$$\tilde{R}(x, y) = R(x, y) + \left[\sum_{i=0}^{N_0-2} c_i(f_{i,0} + f_{i,1})\right] + \left[\sum_{i=N_0}^{N_0+N_1-1} c_i g_i\right] \quad (19)$$

In the above equation, the filtering is separated into 2 parts:

Filter part 1:

$$\left[\sum_{i=0}^{N_0-2} c_i(f_{i,0} + f_{i,1})\right]:$$

filtering by using neighbouring samples, geometric transformation may be applied. $N_0$ is the number of coefficients, which may be 5×5, 7×7, 9×9, 11×11, or 13×13 diamond filters as shown in FIG. 9.

Filter part 2:

$$:\left[\sum_{i=N_0}^{N_0+N_1-1} c_i g_i\right]:$$

filtering by using intermediately filtered samples, geometric transformation may be applied. $N_1$ is the number of coefficients. The function $f_{i,j}$ with j=0 or 1 may be defined with clipping functions as:

$$f_{i,j}=f_{i,j}(R(x+x_{i,j},y+y_{i,j}),R(x,y))=\min(b_i,\max(-b_i,R(x+x_{i,j},y+y_{i,j})-R(x,y))) \quad (20)$$

The function $g_i$ may be defined with clipping functions as:

$$g_i=g_i(R'(x,y,i-N_0),R(x,y))=\min(b_i,\max(-b_i,R'(x,y,i-N_0)-R(x,y))) \quad (21)$$

$b_i$ is the clipping parameter corresponding to coefficient $c_i$. In ECM-1.0, $N_1$=2.

Figure 11:
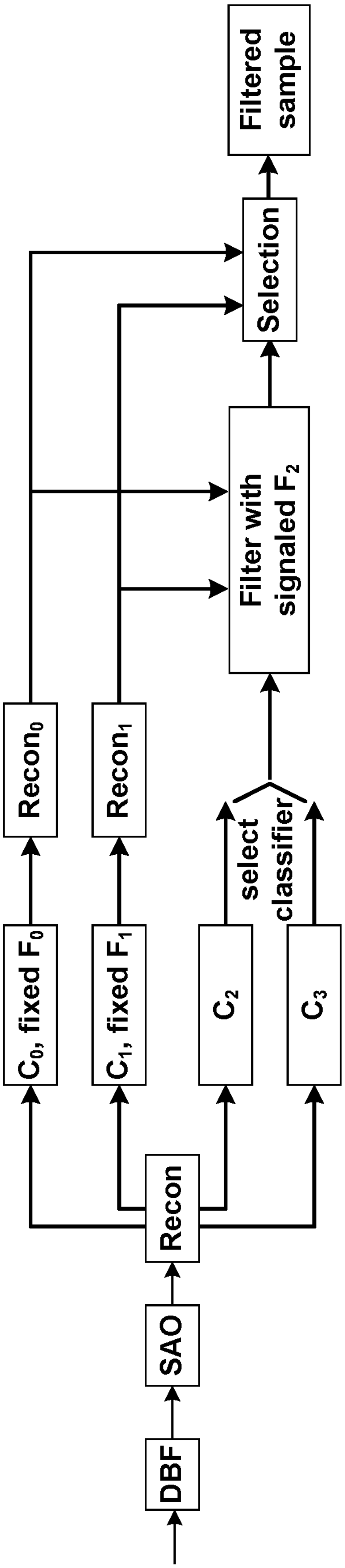
FIG. 11. shows an example ALF framework.

Video encoder 200 and video decoder 300 may be configured to use signaled ALFs with multiple classifiers. In ECM-1.0, C' is a Laplacian-based classifier. To improve the performance of ALF, a multiple-classifier based ALF is proposed in 63/217,067, filed Jun. 30, 2021, incorporated herein by reference, and the band-based classifier is adopted in ECM-3.0 as shown in FIG. 11. In FIG. 11, when a signaled filter is used to filter a current sample, a classifier is selected between C2 and C3 based on a signaled flag. The class index is used to select the filter F2 from a set of signaled filters. C2 is the Laplacian based classifier that is used in ECM-1.0. C3 is the band-based classifier. Like C2, C3 is applied to each non-overlapped 2×2 luma block, the class index is determined as:

(sum*num_classes)>>(2+bit_depth), where sum is the sum of the luma sample values of the 2×2 luma block, num_classes is equal to 25 and bit_depth is the bit depth of a luma sample.

FIG. 11 shows an example ALF framework in accordance with ECM-4.0. As can be seen in the example of FIG. 11, only samples after SAO are used for ALF. However, samples before SAO and deblocking filter (DBF) may also be used. This disclosure describes techniques for using samples before SAO (after DBF) and/or samples before DBF for ALF process. When samples before DBF or samples before SAO are used for ALF, these samples may be used for classification and/or filtering.

When samples before DBF and samples before SAO are used for ALF filtering, eq. (19) may be re-written as:

$$\tilde{R}(x,y) = R(x,y) + \left[\sum_{i=0}^{N_0-2} c_i(f_{i,0}+f_{i,1})\right] + \left[\sum_{i=N_0}^{N_0+N_d-1} c_i d_i\right] + \left[\sum_{i=N_0+N_d}^{N_0+N_d+N_s-1} c_i s_i\right] + \left[\sum_{i=N_0+N_d+N_s}^{N_0+N_d+N_s+N_1-1} c_i g_i\right] \quad (22)$$

The function $d_i$ may be defined with clipping functions as:

$$d_i=d_i(R_d(x+x_i,y+y_i),R(x,y))=\min(b_i,\max(-b_i,R_d(x+x_i,y+y_i)-R(x,y))) \quad (23)$$

where $R_d(x+x_i, y+y_i)$ is a neighboring sample before DBF and $(x_i, y_i)$ is the coordinate offset that relative to current sample R(x, y).

The function $s_i$ may be defined with clipping functions as:

$$s_i=s_i(R_s(x+x_i,y+y_i),R(x,y))=\min(b_i,\max(-b_i,R_s(x+x_i,y+y_i)-R(x,y))) \quad (24)$$

where $R_s(x+x_i, y+y_i)$ is a neighboring sample before SAO and $(x_i, y_i)$ is the coordinate offset that relative to current sample R (x, y).

In equation (22), $N_d$ and $N_s$ are the number of taps that are applied to the samples before DBF and samples before SAO respectively.

Figure 12:
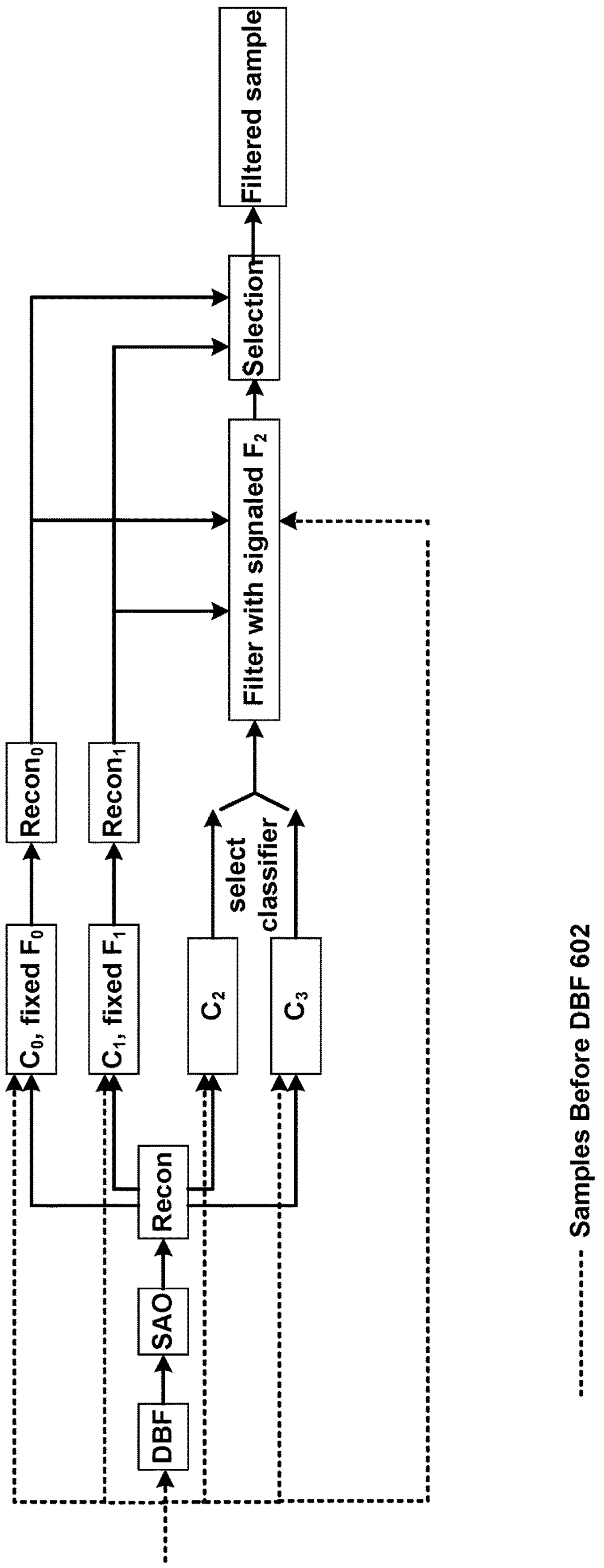
FIGS. 12-14 show example ALF frameworks in accordance with the techniques of this disclosure.

In one example, samples before DBF 602 may be used for ALF, as shown in FIG. 12. In this case, eq (22) becomes:

$$\tilde{R}(x,y) = R(x,y) + \left[\sum_{i=0}^{N_0-2} c_i(f_{i,0}+f_{i,1})\right] + \left[\sum_{i=N_0}^{N_0+N_d-1} c_i d_i\right] + \left[\sum_{i=N_0+N_d}^{N_0+N_d+N_1-1} c_i g_i\right] \quad (25)$$

Figure 13:
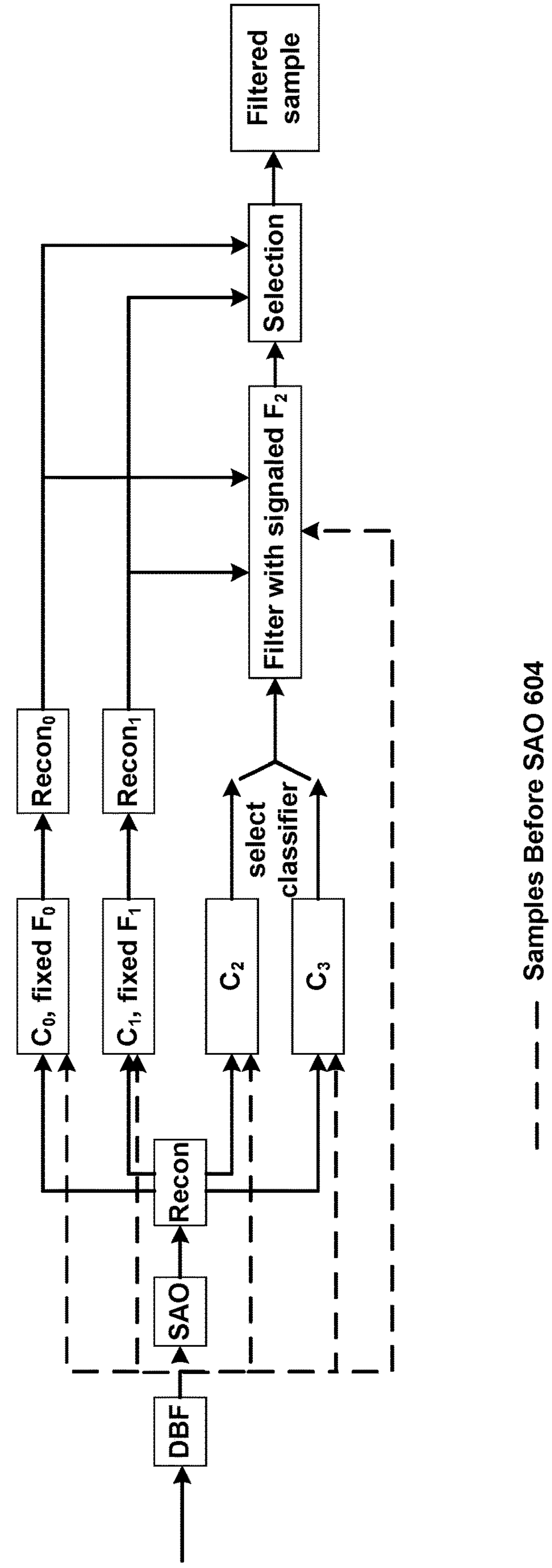

In another example, samples before SAO 604 may be used for ALF, as shown in FIG. 13. In this case, eq. (22) becomes:

$$\tilde{R}(x,y) = R(x,y) + \left[\sum_{i=0}^{N_0-2} c_i(f_{i,0}+f_{i,1})\right] + \left[\sum_{i=N_0}^{N_0+N_s-1} c_i s_i\right] + \left[\sum_{i=N_0+N_s}^{N_0+N_s+N_1-1} c_i g_i\right] \quad (26)$$

Figure 14:
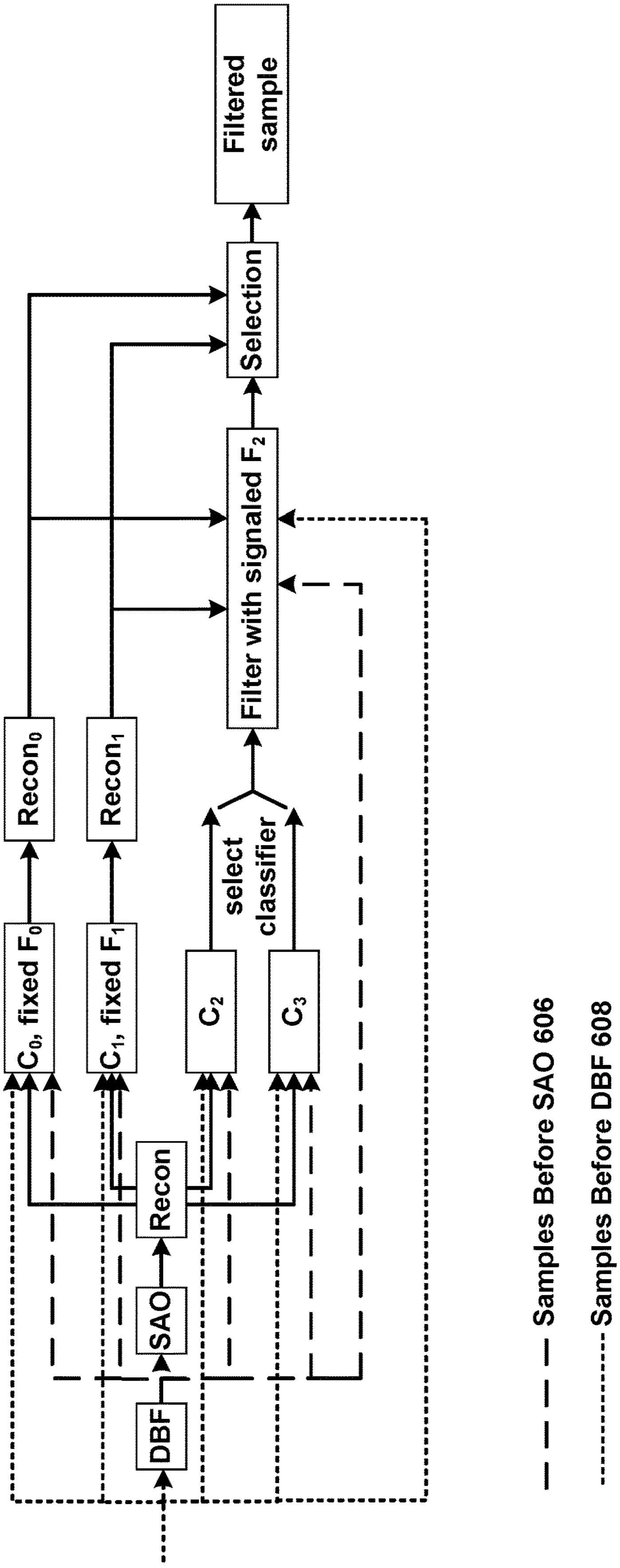

In another example, samples before SAO 606 and samples before DBF 608 are used for the ALF process, as shown in FIG. 14.

In the examples of equations (25) and (26), the coefficients $C_i$ may be signaled and selected based on a classifier as described above.

In accordance with the techniques of this disclosure, video decoder 300 may be configured to determine a pre-filtered reconstructed block of video data and apply one or more of a deblocking filter or a sample adaptive offset filter to the pre-filtered reconstructed block to determine a filtered reconstructed block. Video decoder 300 apply an ALF to the filtered reconstructed block to determine a final filtered reconstructed block. To apply the ALF to the filtered reconstructed block, video decoder 300 may be configured to determine a difference value (e.g., d(i) in equation 23) based on a difference between a value of a current sample (e.g., R above) of the filtered reconstructed block and a value of a pre-filtered neighboring sample (e.g., $R_d$ above); apply a filter (e.g., $c_i$ in equations 25 and 26) to the difference value (e.g., $d_i$ in equation 25 or $s_i$ in equation 26) to determine a sample modification value (e.g., the term $$\left[\sum_{i=N_0}^{N_0+N_d-1} c_i d_i\right]$$

in equation 25 or $$\left[\sum_{i=N_0}^{N_0+N_s-1} c_i s_i\right]$$

in equation 26); and determine a final filtered sample value (e.g., R in equation 25 or 26) based on the sample modification value. To determine the difference value (d(i), eq. 23) based on the difference between the value of the current sample (R) and the value of the pre-filtered neighboring sample ($R_d$), video decoder 300 may, for example, set the difference value equal to the difference (i.e., not perform clipping) or set the difference value equal to a maximum value in response to the difference between the value of the current sample (R) and the value of the pre-filtered neighboring sample ($R_d$) being greater than the maximum value (i.e., perform clipping). That is, video decoder 300 may set the difference value to the minimum of the actual difference or the maximum value.

Figure 15A:
FIGS. 15A-15H show examples of filter taps that may be used for samples before deblocking filtering (DBF) and/or before sample adaptive offset (SAO).
Figure 15B:
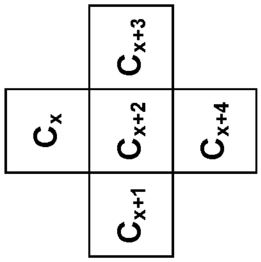
Figure 15C:
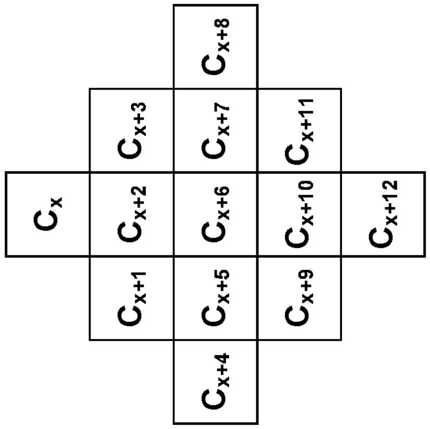
Figure 15D:
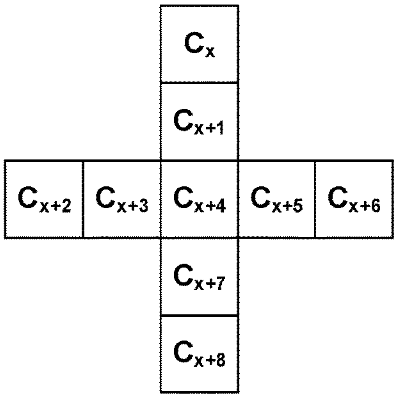
Figure 15E:
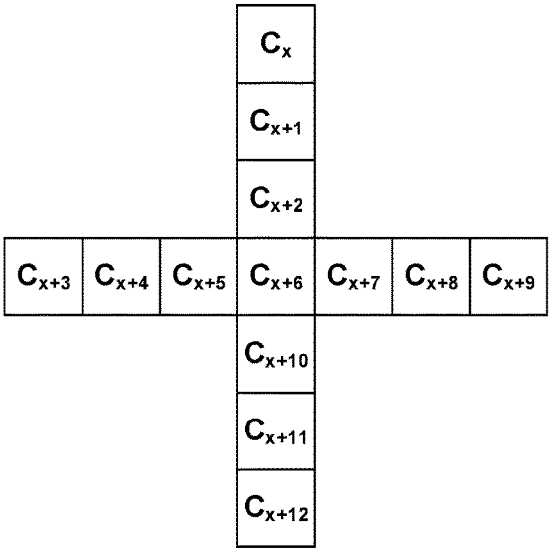
Figure 15F:
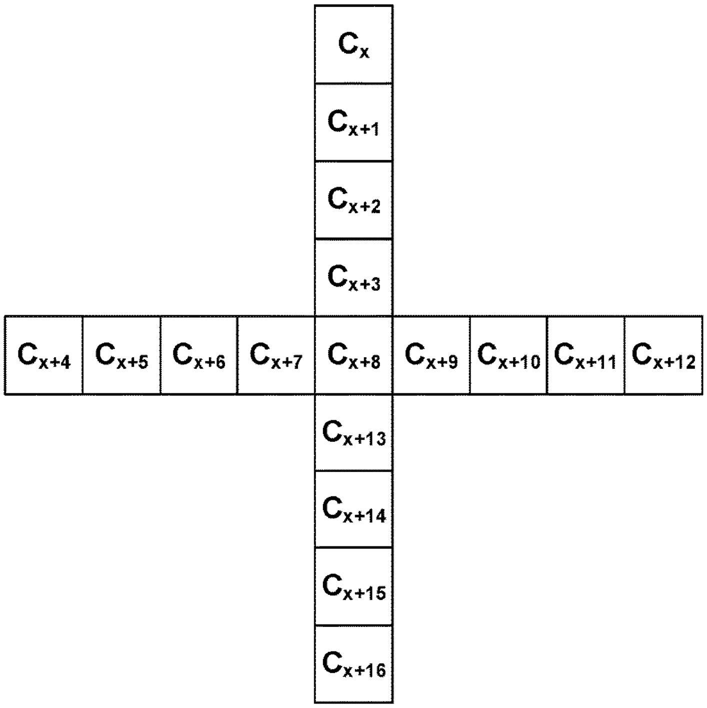
Figure 15H:
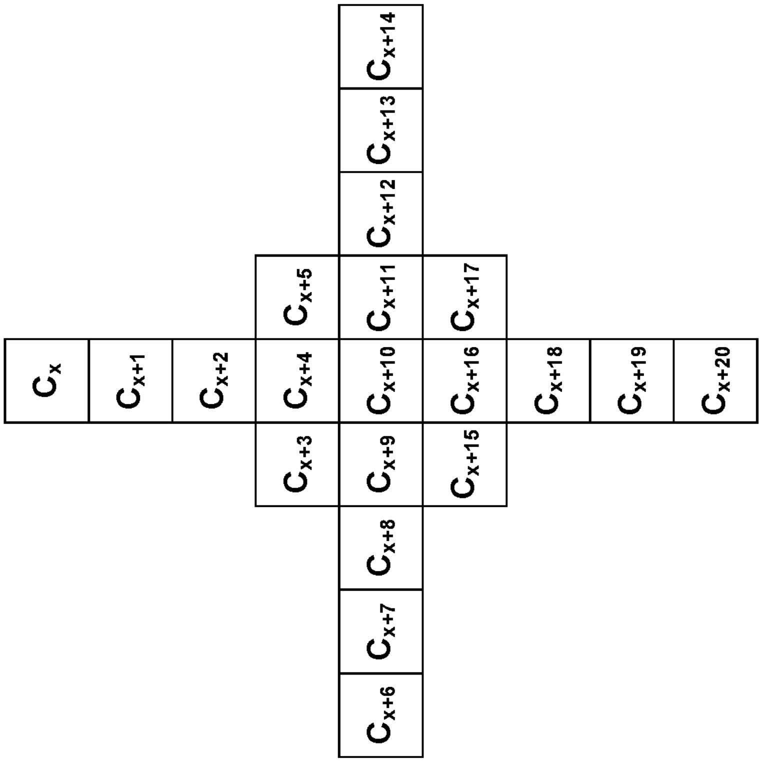
Figure 15G:
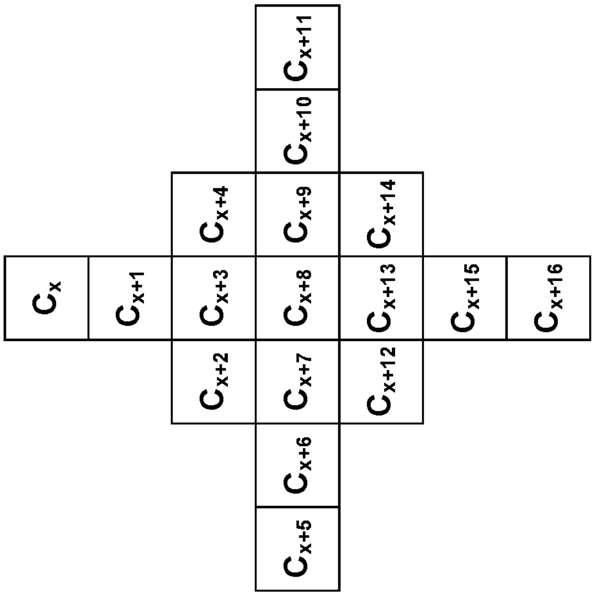

FIGS. 15A-15H show examples of filter taps that may be used for samples before deblocking filtering (DBF) and/or before SAO. In FIGS. 15A-15H, when the taps apply to samples before DBF, $x=N_0$ in eq. (22) and (26). When the taps apply to samples before DBF, $x=N_0+N_d$ in eq. (22) and $x=N_0$ in eq. (26). The center tap may be applied to the sample before DBF/SAO at the coordinates of the current sample. FIG. 15A shows filter 702, which includes 1 tap ($C_x$). FIG. 15B shows filter 704, which includes 4 taps ($C_x$-$C_{x+4}$). FIG. 15C shows filter 706, which includes 13 taps ($C_x$-$C_{x+12}$). FIG. 15D shows filter 708, which includes 9 taps ($C_x$–$C_{x+8}$). FIG. 15E shows filter 710, which includes 13 taps ($C_x$–$C_x$+$1_3$). FIG. 15F shows filter 712, which includes 17 taps ($C_x$–$C_x$+$1_6$). FIG. 15G shows filter 714, which includes 17 taps ($C_x$–$C_x$+$1_7$). FIG. 15H shows filter 716, which includes 21 taps ($C_x$–$C_{x+20}$).

FIGS. 16A-16I show examples of filters that may be used for samples before DBF and/or before SAO that have coefficients that are centrally symmetrical. In FIGS. 16A-16I, when the taps apply to samples before DBF, $x=N_0$ in eq. (22) and (26). When the taps apply to samples before DBF, $x=N_0+N_d$ in eq. (22) and $x=N_0$ in eq. (26). The center tap may be applied to the sample before DBF/SAO at the coordinates of the current sample.

Figure 16D:
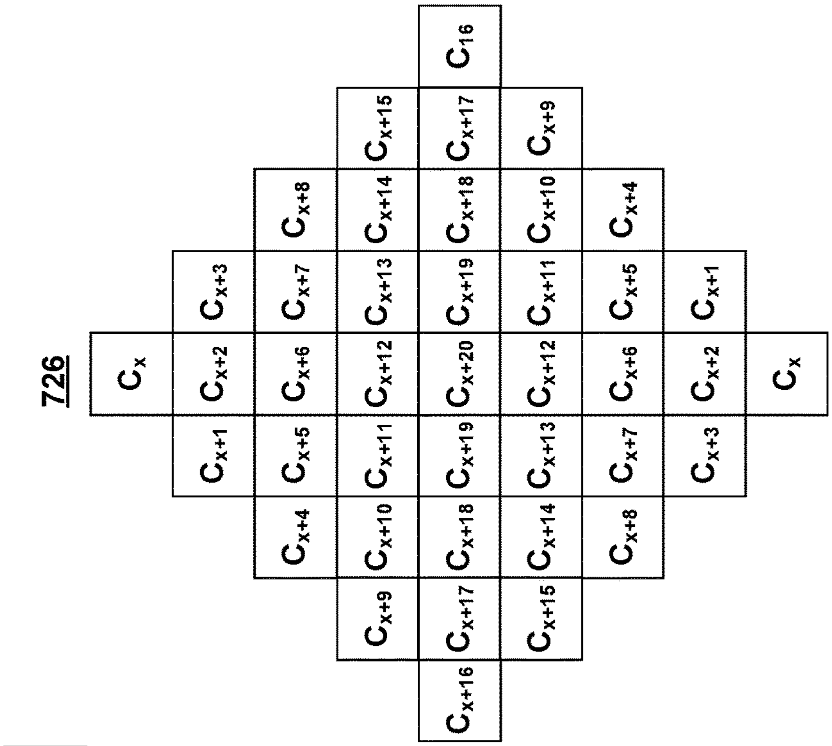
FIGS. 16A-16I show examples of filters that may be used for samples before DBF and/or before SAO that have coefficients that are centrally symmetrical.
Figure 16B:
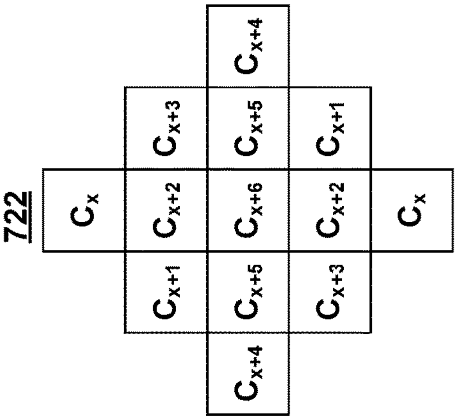
Figure 16C:
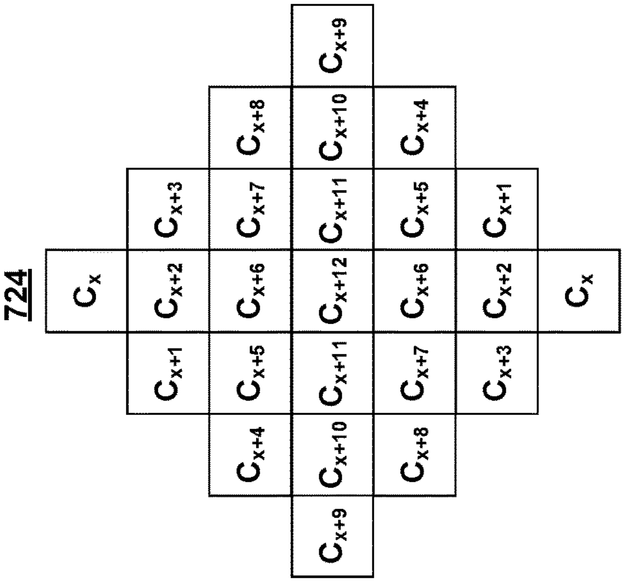
Figure 16A:
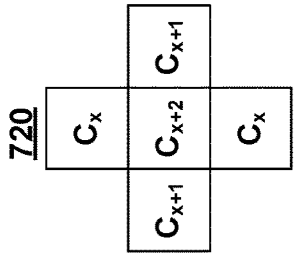
Figure 16E:
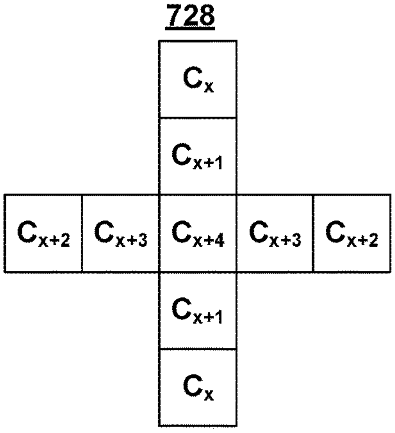
Figure 16G:
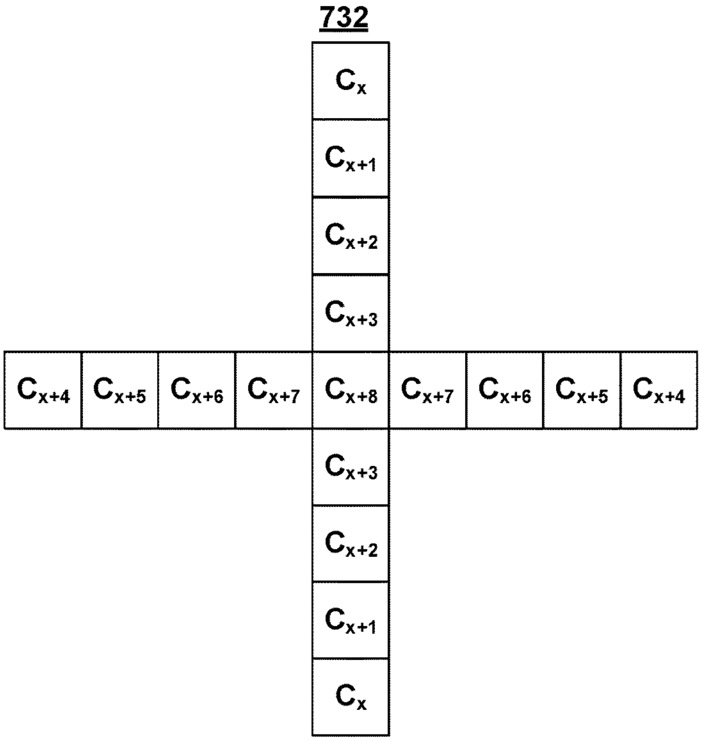
Figure 16F:
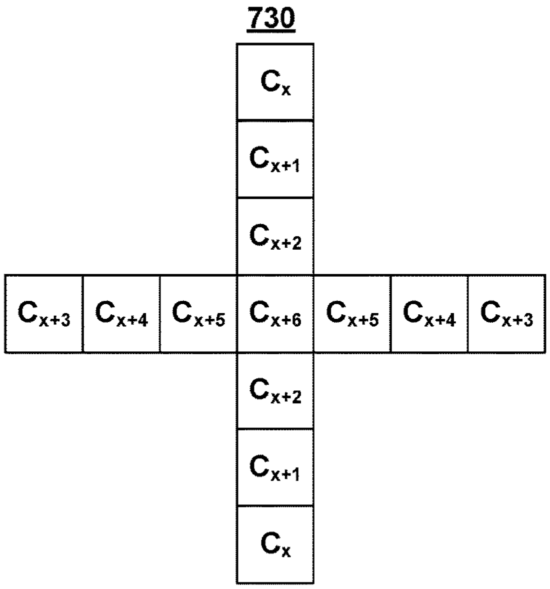
Figure 16I:
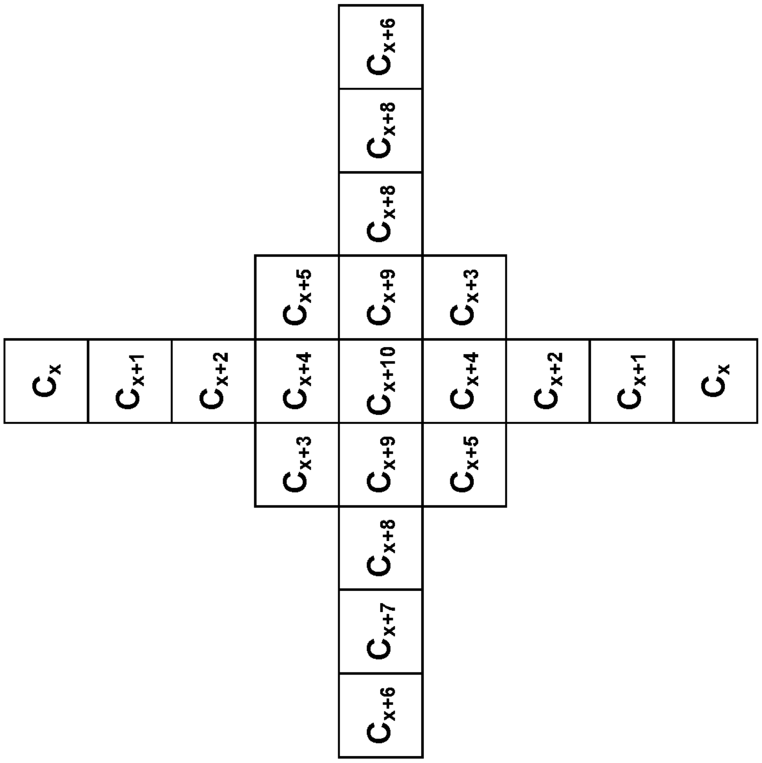
Figure 16H:
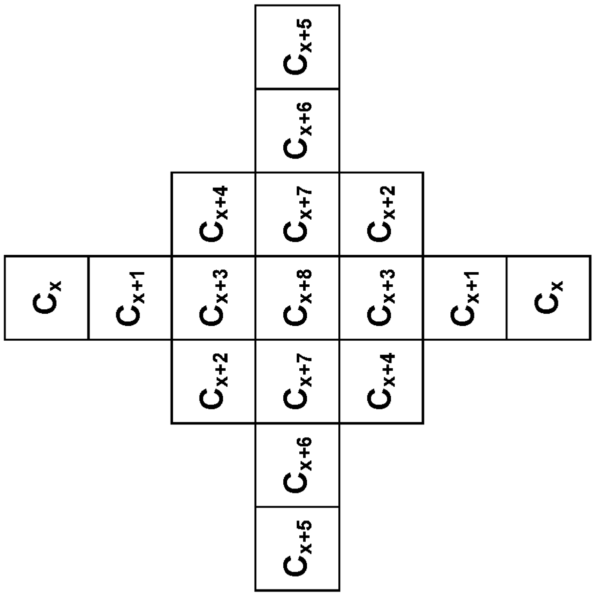

FIG. 16A shows filter 720, which includes 5 taps with 3 unique coefficients ($C_x$–$C_x$+$_2$). FIG. 16B shows filter 722, which includes 13 taps with 7 unique coefficients ($C_x$–$C_x$+$_6$). FIG. 16C shows filter 724, which includes 25 taps with 13 unique coefficients ($C_x$–$C_{x+12}$). FIG. 16D shows filter 726, which includes 41 taps with 21 unique coefficients ($C_x$–$C_{x+20}$). FIG. 16E shows filter 728, which includes 9 taps with 5 unique coefficients ($C_x$–$C_x$+$_4$). FIG. 16F shows filter 730, which includes 13 taps with 7 unique coefficients ($C_x$–$C_x$+$_6$). FIG. 16G shows filter 732, which includes 17 taps with 9 unique coefficients ($C_x$–$C_{x+8}$). FIG. 16H shows filter 734, which includes 17 taps with 9 unique coefficients ($C_x$–$C_{x+8}$). FIG. 16I shows filter 736, which includes 21 taps with 11 unique coefficients ($C_x$–$C_{x+10}$).

When samples before DBF are used for ALF, the filter length applied to the samples before DBF may depend on the length of the DBF applied to the current sample.

Flags may be signaled to indicate whether the samples before DBF and/or samples before SAO are used for ALF. For example, flags may be signaled per filter/per filter set (for example, in an adaptation parameter set (APS)). In another examples, flags may be signaled at sequence/picture/sub-picture/slice/CTU/block level.

In one example, flags maybe signaled at filter/filter set/APS/sequence/picture/sub-picture/slice/CTU/block level to indicate whether the coefficients for samples before DBF are signaled ($c_i$ with $i=N_0 \ldots N_0+N_d-1$ in eq. (22) and $c_i$ with $i=N_0 \ldots N_0+N_d-1$ in eq. (25)). If not signaled, the values of these coefficients may be equal to 0, and this is equivalent to not using samples before DBF for ALF.

In another example, flags maybe signaled at filter/filter set/APS/sequence/picture/sub-picture/slice/CTU/block level to indicate whether the coefficients for samples before SAO are signaled ($c_i$ with $i=N_0+N_d \ldots N_0+N_d+N_s-1$ in eq. (22) and $c_i$ with $i=N_0 \ldots N_0+N_s-1$ in eq. (26)). If not signaled, the values of these coefficients may be equal to 0, and this is equivalent to not using samples before SAO for ALF.

Geometric transposes may be applied to the filter shapes corresponding to the samples before DBF (resp. the samples before SAO). For example, the same transpose process derived in ALF classifiers (C2 or C3) may be applied to the samples before DBF ((resp. the samples before SAO). In another example, the samples before DBF (resp. the samples before SAO) are used to determine the transpose that is applied the samples before DBF (resp. the samples before SAO).

When DBF is not applied to a current sample, the samples before DBF may not be used for ALF of the current sample. When SAO is not applied to the current sample, the samples before SAO may not be used for the ALF of current sample.

All the coefficients applied to samples before DBF (resp. SAO) may be coded with the same processes. For example, fixed length coding, unary coding, kth order exp-Golomb code with k signaled or fixed (for example, the absolute values are coded with exp-Golomb code and sign is coded with another bit).

In eq (22), (25) and (26), the coefficients that apply to central tap of a filter shape (for examples, the central taps in shapes shown in FIGS. 11 and 12) and the coefficients that applied to the samples derived from fixed filters (R') may be signaled by using the same coding techniques. In one example, a first order of exp-Golomb code is used. (for example, the absolute values are coded with exp-Golomb code and sign is coded with another bit). This order may be signaled in bit stream or fixed. In another example, these coefficients may be coded by using fixed length code with the same length, and the length may be fixed or signaled.

In other examples, in eq (22), (25) and (26), the coefficients applied to neighboring samples may be signaled with the same coding techniques. In one example, a second order of exp-Golomb code is used. (for example, the absolute values are coded with exp-Golomb code and sign is coded with another bit). This order may be signaled in the bit stream or fixed. In another example, these coefficients may be coded using fixed length code with the same length, and the length may be fixed or signaled.

Aspects of boundary processing will now be discussed. First, for slice/tile/picture/virtual boundaries, when doing ALF for a current sample, a sample before DBF/SAO may be needed and is located on the different side of a slice/tile/picture/virtual boundary other than the same side of current sample. For example, the neighboring sample is located in a neighboring CTU across slice/tile boundaries. When using samples across a boundary is disabled, that sample before DBF/SAO may not be accessible and may be replaced by the closet sample that on the same side of the boundary as current sample.

For L-shape raster scanned slice boundaries, when doing ALF for a current sample, its top and left CTU are in the same slice as current CTU but top-left CTU is in a different slice. A sample before DBF/SAO from the top-left CTU is needed and usage across slice boundaries are not allowed. For that sample, its closest sample from top or left CTU of current sample may be used.

When doing ALF for a current sample, the right and bottom CTU may be in the same slice as a current CTU, but the bottom-right CTU may be in a different slice. A sample before DBF/SAO from the bottom-right CTU is needed and usage across slice boundaries are not allowed. For that sample, the closest sample from the right or bottom CTU of the current sample may be used.

For ALF virtual boundaries (e.g., ALF line buffer boundaries), when doing ALF for a current sample, ALF virtual boundaries, such as 4 luma lines and 2 chroma lines above horizontal CTU boundaries in VVC, are used to reduce the hardware storage burden. When a sample before DBF/SAO may be needed and is located on the different side of an ALF virtual boundary other than the same side of current sample, that sample before DBF/SAO may not be accessible and may be replaced by the closet sample that is on the same side of the boundary as the current sample. In another example, symmetrical padding may be used to replace that unavailable sample.

Figure 17:
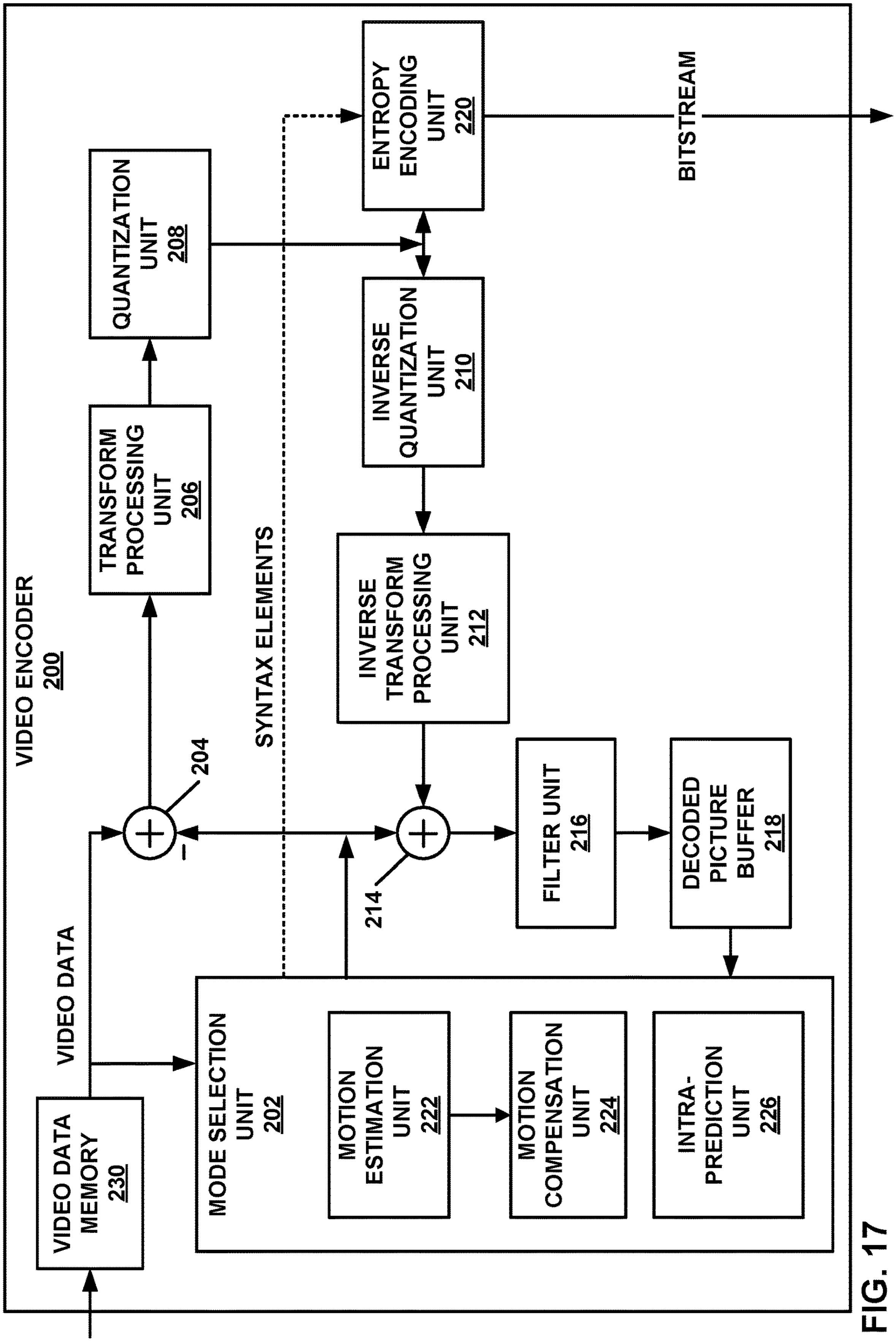
FIG. 17 is a block diagram illustrating an example video encoder that may perform the techniques of this disclosure.

FIG. 17 is a block diagram illustrating an example video encoder 200 that may perform the techniques of this disclosure. FIG. 17 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 17, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 17 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a pre-filtered reconstructed block of video data; apply one or more of a deblocking filter or a sample adaptive offset filter to the pre-filtered reconstructed block to determine a filtered reconstructed block; and apply an ALF to the filtered reconstructed block to determine a final filtered reconstructed block. To apply the ALF to the filtered reconstructed block, video encoder 200 may be configured to determine a filter from a set of filters based on a sample value of a sample in the pre-filtered reconstructed block and apply the filter to a corresponding sample in the filtered reconstructed block.

Figure 18:
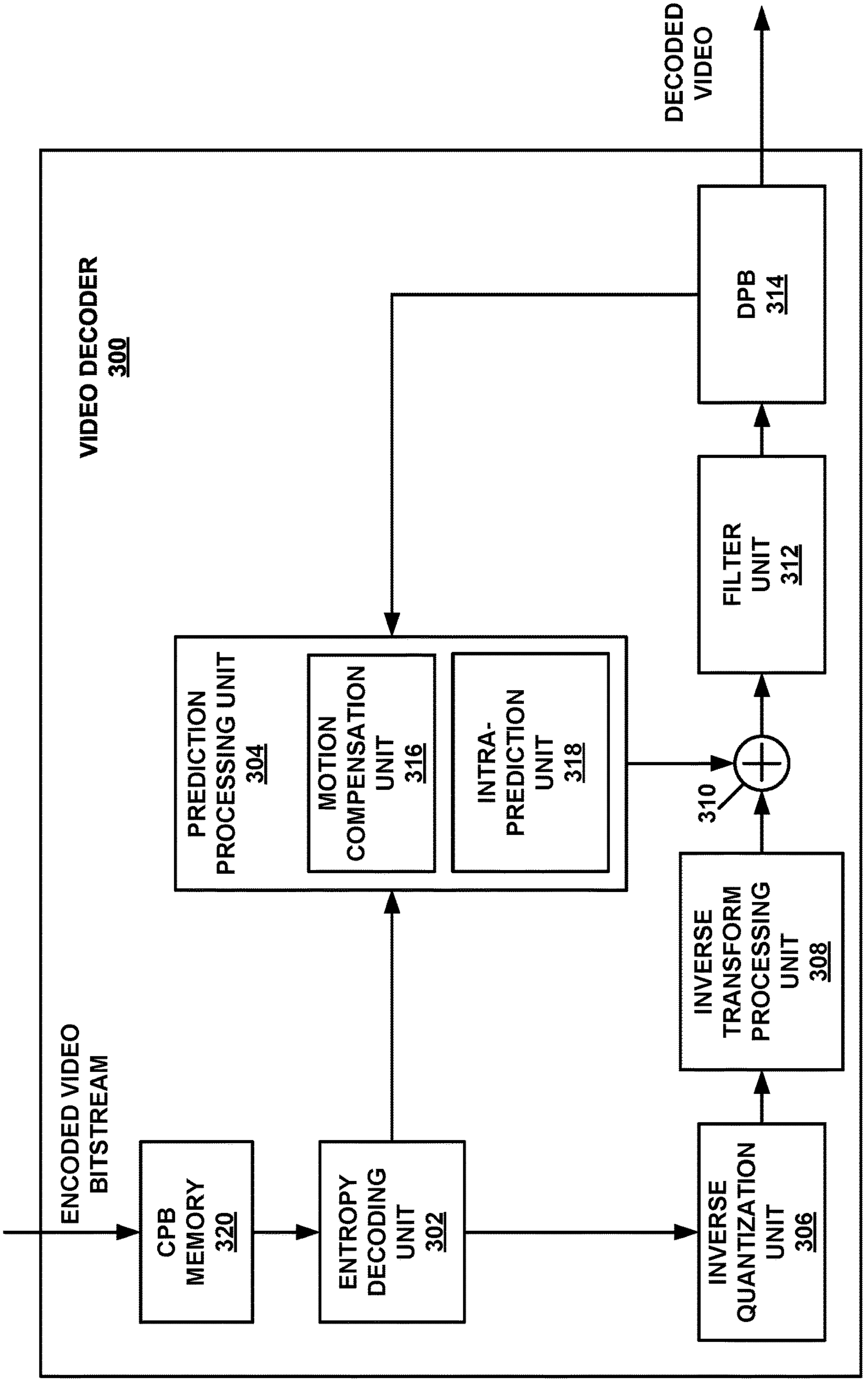
FIG. 18 is a block diagram illustrating an example video decoder that may perform the techniques of this disclosure.

FIG. 18 is a block diagram illustrating an example video decoder 300 that may perform the techniques of this disclosure. FIG. 18 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 18, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 18 are illustrated to assist with understanding the operations performed by video decoder 300. The units may be implemented as fixed-function circuits, programmable circuits, or a combination thereof. Similar to FIG. 17, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 17).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 17). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine a pre-filtered reconstructed block of video data; apply one or more of a deblocking filter or a sample adaptive offset filter to the pre-filtered reconstructed block to determine a filtered reconstructed block; and apply an ALF to the filtered reconstructed block to determine a final filtered reconstructed block. To apply the ALF to the filtered reconstructed block, video decoder 300 may be configured to determine a filter from a set of filters based on a sample value of a sample in the pre-filtered reconstructed block and apply the filter to a corresponding sample in the filtered reconstructed block.

Figure 19:
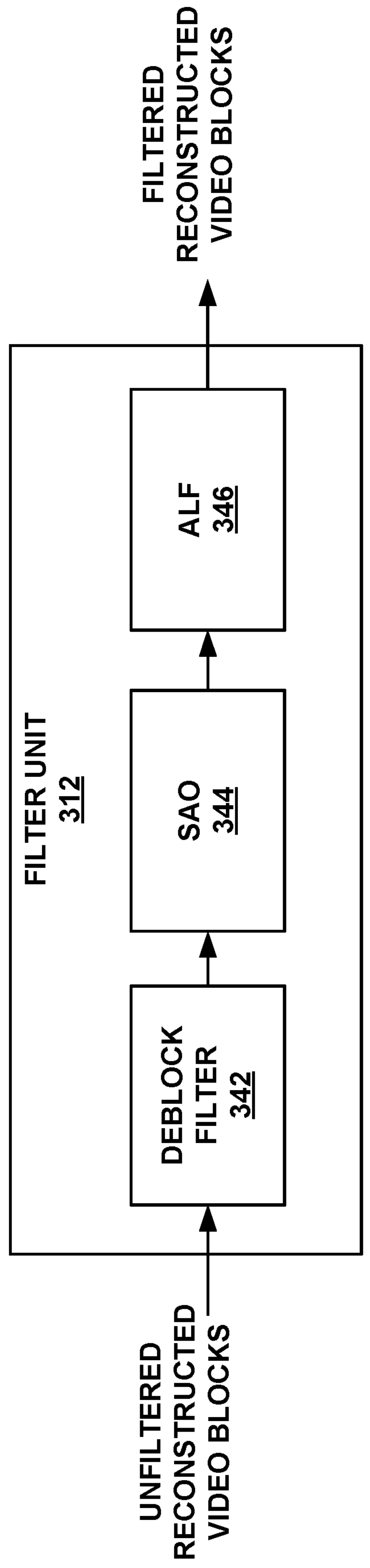
FIG. 19 is a block diagram illustrating an example filter unit for performing the techniques of this disclosure.

FIG. 19 shows an example implementation of filter unit 312 in FIG. 18. Filter unit 216 in FIG. 17 may be implemented in a substantially similar manner. Filter units 216 and 312 may perform the techniques of this disclosure, possibly in conjunction with other components of video encoder 200 or video decoder 300. In the example of FIG. 19, filter unit 312 includes deblock filter 342, SAO filter 344, and ALF unit 346. SAO filter 344 may, for example, be configured to determine offset values for samples of a block in the manner described in this disclosure. ALF unit 346 may likewise filter blocks of video data in the manner described in this disclosure.

Filter unit 312 may include fewer filters and/or may include additional filters. Additionally, the particular filters shown in FIG. 19 may be implemented in a different order. Other loop filters (either in the coding loop or after the coding loop) may also be used to smooth pixel transitions or otherwise improve the video quality. The filtered reconstructed video blocks output by filter unit 312 may be stored in DPB 314, which stores reference pictures used for subsequent motion compensation. DPB 314 may be part of or separate from additional memory that stores decoded video for later presentation on a display device, such as display device 118 of FIG. 1.

According to the techniques of this disclosure, filter unit 312 may, for example, be configured to receive a pre-filtered reconstructed block of video data from reconstruction unit 310. Filter unit 312 may apply one or more of a deblocking filter (e.g., deblock filter 342) or a sample adaptive offset filter (e.g., SAO 344) to the pre-filtered reconstructed block to determine a filtered reconstructed block. ALF 346 may be configured to adjust samples of the filtered reconstructed block to determine a final filtered reconstructed block. For example, ALF 346 may be configured to determine a difference value based on a difference between a value of a current sample of the filtered reconstructed block and a value of a pre-filtered neighboring sample. ALF 346 may, for example, determine the different value in accordance with equation (23) above. ALF 345 may then apply a filter to the difference value to determine a sample modification value. The sample modification value may, for example, correspond to the term $$\left(\left[\sum_{i=N_0}^{N_0+N_d-1} c_i d_i\right]\right)$$

in equation (25) above. ALF 346 may determine a final filtered sample value based on the sample modification value. ALF 346 may output, for example to DPB 314 and/or for display, a picture of video data that includes the final filtered reconstructed block.

Figure 20:
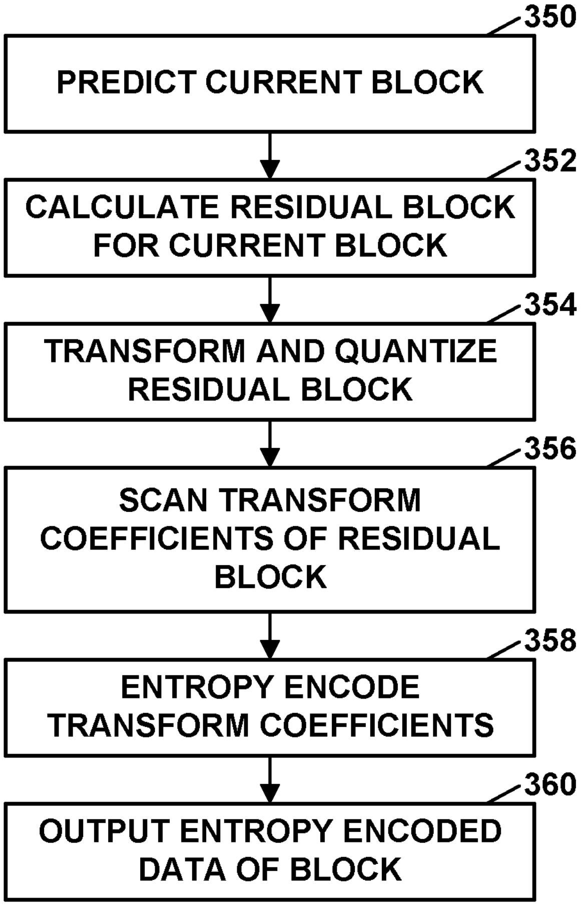
FIG. 20 is a flowchart illustrating an example process for encoding a current block in accordance with the techniques of this disclosure.

FIG. 20 is a flowchart illustrating an example process for encoding a current block in accordance with the techniques of this disclosure. The current block may comprise a current CU. Although described with respect to video encoder 200 (FIGS. 1 and 18), it should be understood that other devices may be configured to perform a process similar to that of FIG. 20.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 21:
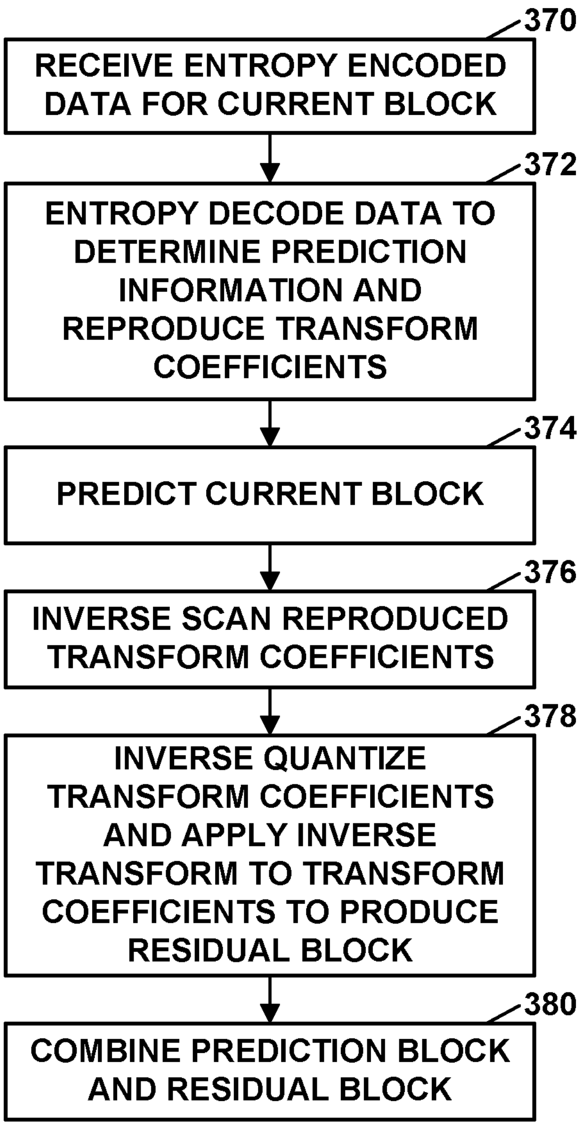
FIG. 21 is a flowchart illustrating an example process for decoding a current block in accordance with the techniques of this disclosure.

FIG. 21 is a flowchart illustrating an example process for decoding a current block of video data in accordance with the techniques of this disclosure. The current block may comprise a current CU. Although described with respect to video decoder 300 (FIGS. 1 and 19), it should be understood that other devices may be configured to perform a process similar to that of FIG. 21.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 22:
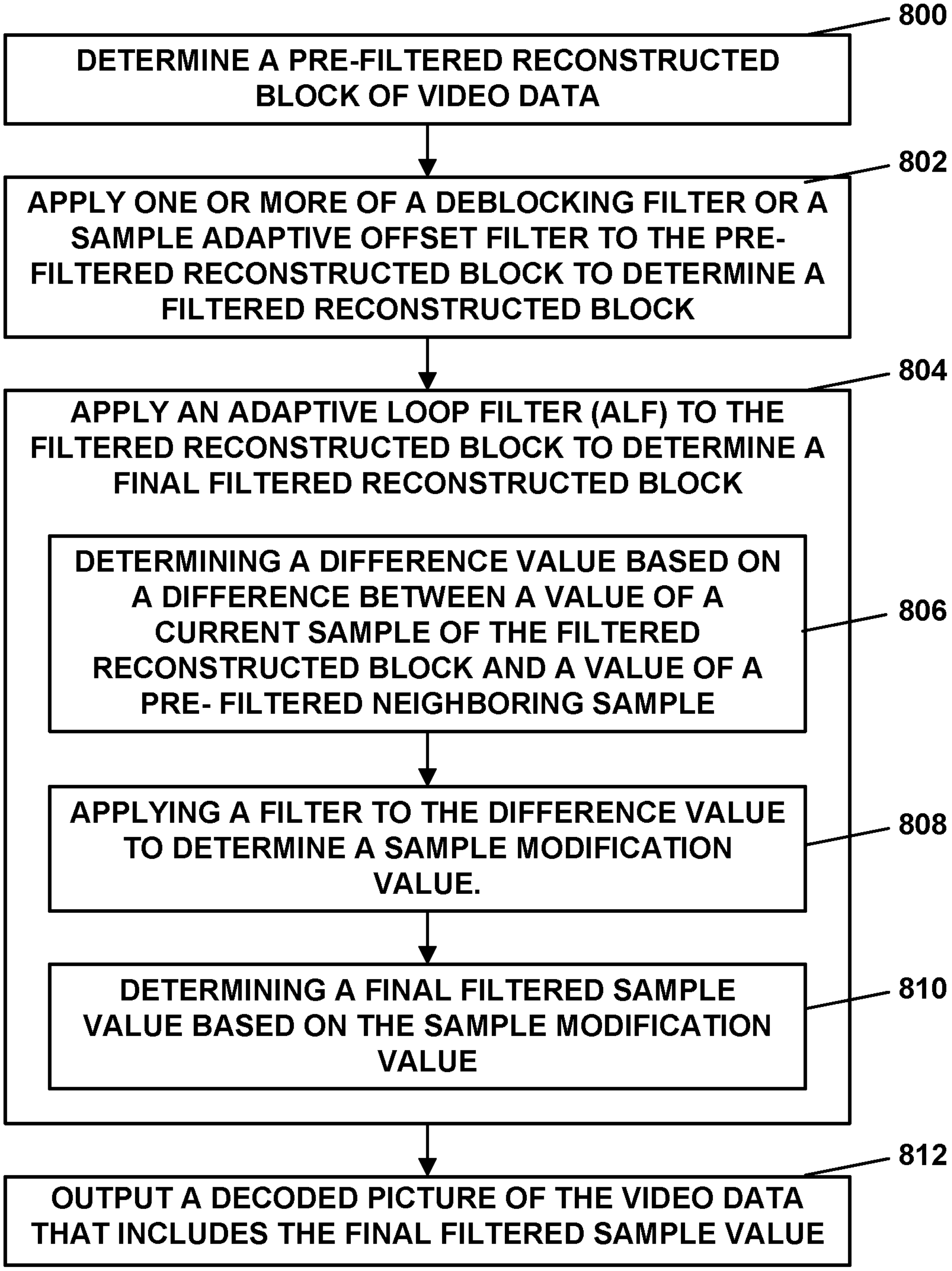
FIG. 22 is a flowchart illustrating an example process for decoding a current block of video data in accordance with the techniques of this disclosure.

FIG. 22 is a flowchart illustrating an example process for decoding a current block of video data in accordance with the techniques of this disclosure. Although described with respect to video decoder 300 (FIGS. 1 and 18), it should be understood that other devices may be configured to perform a process similar to that of FIG. 20. For example, the video decoding loop of video encoder 200, including filter unit 216, may perform the techniques of FIG. 22.

In the example of FIG. 22, video decoder 300 determines a pre-filtered reconstructed block of video data (800). Video decoder 300 applies one or more of a deblocking filter or a sample adaptive offset filter to the pre-filtered reconstructed block to determine a filtered reconstructed block (802). Video decoder 300 applies an adaptive loop filter (ALF) to the filtered reconstructed block to determine a final filtered reconstructed block (804). To apply the ALF to the filtered reconstructed block, video decoder 300 determines a difference value based on a difference between a value of a current sample of the filtered reconstructed block and a value of a pre-filtered neighboring sample (806). The value of the pre-filtered neighboring sample may, for example, be a value of a neighboring sample before one or both of the deblock filter or the sample adaptive offset filter are applied to the neighboring sample.

As part of applying the ALF to the filtered reconstructed block (804), video decoder 300 also applies a filter to the difference value to determine a sample modification value (808). As part of applying the ALF to the filtered reconstructed block (804), video decoder 300 also determines a final filtered sample value based on the sample modification value (810).

As part of applying the ALF to the filtered reconstructed block (804), video decoder 300 may additionally apply a first stage ALF to the current sample. To apply the first stage ALF, video decoder 300 may determine a first class index for the current sample, select a filter from a first set of filters based on the first class index, and apply the filter from the first set of filters to the reconstructed sample to determine a first intermediate sample value. As part of applying the ALF to the filtered reconstructed block (804), video decoder 300 may additionally apply a second stage ALF to the current sample. To applying the second stage ALF to the current sample, video decoder 300 may determine a second class index for the current sample, select a second filter from a second set of filters based on the second class index, apply the second filter to the current sample to determine a second sample modification value, determine a third sample modification value based on the first intermediate sample value, and determine the final filtered sample value based on the sample modification value, the second sample modification value, and the third sample modification value. The sample modification value, the second sample modification value, and the third sample modification value may, for example, correspond to the three summation terms in equation 25 above.

Video decoder 300 may output a decoded picture of the video data that includes the final filtered sample value (812). Video decoder 300 may output the decoded picture by storing the picture in a decoded picture buffer for use in decoding subsequent pictures, storing the decoded picture to a storage medium for later display, or by outputting the decoded picture to a display device for real-time or near real-time display. In instances where the techniques of FIG. 22 are performed by a video encoder, the video encoder may, for example, output the decoded picture by storing the picture in a decoded picture buffer for use in encoding subsequent pictures.

The following numbered clauses illustrate one or more aspects of the devices and techniques described in this disclosure.

Clause 1A: A method of decoding video data, the method comprising:

determining a pre-filtered reconstructed block of video data; applying one or more of a deblocking filter or a sample adaptive offset filter to the pre-filtered reconstructed block to determine a filtered reconstructed block; applying an adaptive loop filter (ALF) to the filtered reconstructed block to determine a final filtered reconstructed block, wherein applying the ALF to the filtered reconstructed block comprises: determining a filter from a set of filters based on a sample value of the pre-filtered reconstructed block; and applying the filter to a corresponding sample in the filtered reconstructed block.

Clause 2A: The method of clause 1A, wherein determining the filter from the set of filters based on the sample value of the pre-filtered reconstructed block comprises determining the filter from the set of filters based on one or both of an activity and a direction for the sample value.

Clause 3A: The method of clause 1A or 2A, wherein determining the filter from the set of filters based on the sample value of the pre-filtered reconstructed block comprises determining the filter from the set of filters based on the sample value of the pre-filtered reconstructed block and a corresponding sample value of the filtered reconstructed block.

Clause 4A: The method of any of clauses 1A-3A, further comprising: receiving signaling, wherein the signaling indicates if the filter is determined from the set of filters based on the sample value of the pre-filtered reconstructed block, a corresponding sample value of the filtered reconstructed block, or both the sample value of the pre-filtered reconstructed block and the corresponding sample value of the filtered reconstructed block.

Clause 5A: A method of decoding video data, the method comprising: applying a first stage adaptive loop filter (ALF) to a filtered reconstructed sample of a reconstructed block, wherein applying the first stage ALF comprises: determining a first class index for the fileted reconstructed sample based on a value of a corresponding pre-filtered reconstructed sample; selecting a filter from a first set of filters based on the first class index; and applying the filter from the first set of filters to the filtered reconstructed sample to determine a first intermediate sample value; applying a second stage ALF to the filtered reconstructed sample, wherein applying the second stage ALF comprises: determining a second class index for the filtered reconstructed sample based on the pre-filtered reconstructed sample; selecting a second filter from a second set of filters based on the second class index; applying the second filter to the filtered reconstructed sample to determine a first sample modification value; determining a second sample modification value based on the first intermediate sample value; and determining a final filtered reconstructed sample based on the filtered reconstructed sample, the first sample modification value, and the second sample modification value.

Clause 6A: The method of clause 5A, further comprising: applying a deblocking filter to the pre-filtered reconstructed sample to determine the filtered reconstructed sample.

Clause 7A: The method of clause 5A, further comprising: applying a sample adaptive offset filter to the pre-filtered reconstructed sample to determine the filtered reconstructed sample.

Clause 8A: The method of clause 5A, further comprising: applying a deblocking filter and a sample adaptive offset filter to the pre-filtered reconstructed sample to determine the filtered reconstructed sample.

Clause 9A: The method of any of clauses 5A-8A, wherein the first set of filters comprises fixed filters.

Clause 10A: The method of any of clauses 5A-9A, wherein the second set of filters comprises signaled filters determined based on syntax signaled in the video data.

Clause 11A: The method of any of clauses 5A-10A, wherein determining the first class index comprises: determining an activity value for the pre-reconstructed sample; determining a direction for the pre-reconstructed sample; and determining the first class index based on the activity value and the direction.

Clause 12A: The method of clause 11A, wherein determining the direction comprises assigning one of 56 values to the direction.

Clause 13A: The method of any of clauses 5A-12A, wherein the first set of filters includes a 9×9 diamond-shaped filter.

Clause 14A: The method of any of clauses 5A-13A, wherein determining the final filtered reconstructed sample based on the filtered reconstructed sample, the first sample modification value, and the second sample modification value comprises adding the first sample modification value and the second sample modification value to the filtered reconstructed sample.

Clause 15A: The method of any of clauses 5A-13A, wherein determining the second sample modification value based on the first intermediate sample value comprises clipping the second sample modification value to determine a clipped sample modification value and adding the first sample modification value and the clipped sample modification value to the filtered reconstructed sample.

Clause 16A: The method of clause 15A, further comprising: receiving, in the video data, the clipped sample modification value.

Clause 17A: The method of any of clauses 5A-16A, wherein determining the second sample modification value based on the first intermediate sample value comprises determining a difference between the filtered reconstructed sample and the first intermediate sample value.

Clause 18A: The method of any of clauses 5A-17A, further comprising: selecting the first set of filters from a plurality of sets of fixed filters based on a quantization parameter for the reconstructed block.

Clause 19A: The method of any of clauses 5A-18A, wherein applying the first stage ALF further comprises determining a third class index for the pre-filtered reconstructed sample, selecting a third filter from a second set of filters based on the third class index, and applying the third filter from the second set of filters to the pre-filtered reconstructed sample to determine a second intermediate sample value; applying the second stage ALF to the pre-filtered reconstructed sample further comprises determining the second sample modification value based on the first intermediate sample value and the second intermediate sample value.

Clause 20A: The method of any of clauses 5A-19A, further comprising: adding a predicted sample value to a residual sample value to determine the pre-filtered reconstructed sample.

Clause 21A: The method of clause 20A, further comprising: applying one or both of a deblocking filter or a sample adaptive offset filter to a sum of the predicted sample value and the residual sample value to determine the filtered reconstructed sample.

Clause 22A: The method of any of clauses 5A-21A, further comprising: outputting a decoded picture of the video data, wherein the decoded picture comprises the final filtered reconstructed sample.

Clause 23A: A method of decoding video data, the method comprising: applying a first stage adaptive loop filter (ALF) to a filtered reconstructed sample of a reconstructed block, wherein applying the first stage ALF comprises: determining a first class index for the filtered reconstructed sample based on a value of a corresponding pre-filtered reconstructed sample; selecting a first filter from a first set of filters based on the first class index; and applying the first filter from the first set of filters to the filtered reconstructed sample to determine a first intermediate sample value; determining a second class index for the filtered reconstructed sample based on a value of the corresponding pre-filtered reconstructed sample; selecting a second filter from a second set of filters based on the second class index; and applying the second filter from the second set of filters to the filtered reconstructed sample to determine a second intermediate sample value; applying a second stage ALF to the filtered reconstructed sample and the first and second intermediate sample values, wherein applying the second stage ALF comprises: determining a third class index for the filtered reconstructed sample based on the corresponding pre-filtered reconstructed sample; selecting a third filter from a third set of filters based on the third class index; applying the third filter to the filtered reconstructed samples and the first and second intermediated sample values to determine a third sample modification value; determining a final filtered reconstructed sample based on the filtered reconstructed sample, the first intermediate value, and the second intermediate value, and the third sample modification value.

Clause 24A: The method of any of clauses 1A-23A, wherein the method of decoding is performed as part of a video encoding process.

Clause 25A: A device for coding video data, the device comprising one or more means for performing the method of any of clauses 1A-24A.

Clause 26A: The device of clause 21A, wherein the one or more means comprise one or more processors implemented in circuitry.

Clause 27A: The device of any of clauses 25A and 26A, further comprising a memory to store the video data. Clause 28A: The device of any of clauses 25A-27A, further comprising a display configured to display decoded video data.

Clause 29A: The device of any of clauses 25A-28A, wherein the device comprises one or more of a camera, a computer, a mobile device, a broadcast receiver device, or a set-top box.

Clause 30A: The device of any of clauses 25A-29A, wherein the device comprises a video decoder.

Clause 31A: The device of any of clauses 25A-30A, wherein the device comprises a video encoder.

Clause 32A: A computer-readable storage medium having stored thereon instructions that, when executed, cause one or more processors to perform the method of any of clauses 1A-24A.

Clause 1B: A method of decoding video data, the method comprising: determining a pre-filtered reconstructed block of video data; applying one or more of a deblocking filter or a sample adaptive offset filter to the pre-filtered reconstructed block to determine a filtered reconstructed block; and applying an adaptive loop filter (ALF) to the filtered reconstructed block to determine a final filtered reconstructed block, wherein applying the ALF to the filtered reconstructed block comprises: determining a difference value based on a difference between a value of a current sample of the filtered reconstructed block and a value of a pre-filtered neighboring sample; applying a filter to the difference value to determine a sample modification value; and determining a final filtered sample value based on the sample modification value.

Clause 2B: The method of clause 1B, wherein determining the difference value based on the difference between the value of the current sample and the value of the pre-filtered neighboring sample comprises setting the difference value equal to the difference.

Clause 3B: The method of clause 1B, wherein determining the difference value based on the difference between the value of the current sample and the value of the pre-filtered neighboring sample comprises setting the difference value equal to a maximum value in response to the difference between the value of the current sample and the value of the pre-filtered neighboring sample being greater than the maximum value.

Clause 4B: The method of any of clauses 1B-3B, wherein applying the ALF to the filtered reconstructed block further comprises: determining a class index for the current sample; selecting a filter based on the class index; applying the selected filter to the current sample to determine a second sample modification value; and determining the final filtered sample value based on the sample modification value and the second sample modification value.

Clause 5B: The method of clause 4B, further comprising: determining an activity metric for the current sample; determining a direction metric for the current sample; and determining the class index based on an activity metric and the direction metric.

Clause 6B: The method of clause 4B or 5B, wherein applying the selected filter to the current sample comprises multiplying coefficients of the selected filter by values of corresponding filter support positions, the corresponding filter support positions comprising values of samples of the filtered reconstructed block.

Clause 7B: The method of any of clauses 1B-6B, further comprising: applying a first stage adaptive loop filter (ALF) to the current sample, wherein applying the first stage ALF comprises: determining a class index for the current sample; selecting a filter from a set of filters based on the class index; and applying the filter from the set of filters to a reconstructed sample to determine an intermediate sample value; applying a second stage ALF to the current sample, wherein applying the second stage ALF comprises: selecting a second filter from a second set of filters based on a second class index; and applying the second filter to the intermediate sample value to determine a second sample modification value; and determining the final filtered sample value based on the sample modification value and the second sample modification value.

Clause 8B: The method of any of clauses 1B-6B, further comprising: applying a first stage adaptive loop filter (ALF) to the current sample, wherein applying the first stage ALF comprises: determining a first class index for the current sample; selecting a filter from a first set of filters based on the first class index; and applying the filter from the first set of filters to a reconstructed sample to determine a first intermediate sample value; applying a second stage ALF to the current sample, wherein applying the second stage ALF comprises: determining a second class index for the current sample; selecting a second filter from a second set of filters based on the second class index; applying the second filter to the current sample to determine a second sample modification value; determining a third sample modification value based on the first intermediate sample value; and determining the final filtered sample value based on the sample modification value, the second sample modification value, and the third sample modification value.

Clause 9B: The method of clause 8B, wherein determining the final filtered sample value based on the sample modification value, the second sample modification value, and the third sample modification value comprises adding the sample modification value, the second sample modification value, and the third sample modification value to the current sample.

Clause 10B: The method of any of clauses 1B-9B, wherein applying one or more of the deblocking filter or the sample adaptive offset filter to the pre-filtered reconstructed block to determine the filtered reconstructed block comprises applying the deblocking filter to a pre-filtered reconstructed sample to determine a filtered reconstructed sample.

Clause 11B: The method of any of clauses 1B-9B, wherein applying one or more of the deblocking filter or the sample adaptive offset filter to the pre-filtered reconstructed block to determine the filtered reconstructed block comprises applying the deblocking filter and the sample adaptive offset filter to a pre-filtered reconstructed sample to determine a filtered reconstructed sample.

Clause 12B: The method of any of clauses 1B-11B, wherein the value of the pre-filtered neighboring sample comprises a value of a neighboring sample before one or both of the deblock filter or the sample adaptive offset filter are applied to the neighboring sample.

Clause 13B: The method of any of clauses 1B-12B, further comprising: outputting a picture of video data that includes the final filtered reconstructed block.

Clause 14B: The method of any of clauses 1B-13B, wherein the method of decoding is performed as part of a video encoding process.

Clause 15B: A device for decoding video data, the device comprising: a memory configured to store video data; one or more processors implemented in circuitry and configured to: determine a pre-filtered reconstructed block of video data; apply one or more of a deblocking filter or a sample adaptive offset filter to the pre-filtered reconstructed block to determine a filtered reconstructed block; apply an adaptive loop filter (ALF) to the filtered reconstructed block to determine a final filtered reconstructed block, wherein to apply the ALF to the filtered reconstructed block, the one or more processors are further configured to: determine a difference value based on a difference between a value of a current sample of the filtered reconstructed block and a value of a pre-filtered neighboring sample; apply a filter to the difference value to determine a sample modification value; and determine a final filtered sample value based on the sample modification value.

Clause 16B: The device of clause 15B, wherein to determine the difference value based on the difference between the value of the current sample and the value of the pre-filtered neighboring sample, the one or more processors are further configured to set the difference value equal to the difference.

Clause 17B: The device of clause 15B, wherein to determine the difference value based on the difference between the value of the current sample and the value of the pre-filtered neighboring sample, the one or more processors are further configured to set the difference value equal to a maximum value in response to the difference between the value of the current sample and the value of the pre-filtered neighboring sample being greater than the maximum value.

Clause 18B: The device of any of clauses 15B-17B, wherein to apply the ALF to the filtered reconstructed block further, the one or more processors are further configured to: determine a class index for the current sample; select a filter based on the class index; apply the selected filter to the current sample to determine a second sample modification value; and determine the final filtered sample value based on the sample modification value and the second sample modification value.

Clause 19B: The device of clause 18B, wherein the one or more processors are further configured to: determine an activity metric for the current sample; determine a direction metric for the current sample; and determine the class index based on an activity metric and the direction metric.

Clause 20B: The device of clause 18B or 19B, wherein to apply the selected filter to the current sample, the one or more processors are further configured to multiply coefficients of the selected filter by values of corresponding filter support positions, the corresponding filter support positions comprises values of samples of the filtered reconstructed block.

Clause 21B: The device of any of clauses 15B-20B, wherein the one or more processors are further configured to: apply a first stage adaptive loop filter (ALF) to the current sample, wherein to apply the first stage ALF, the one or more processors are further configured to: determine a class index for the current sample; select a filter from a set of filters based on the class index; and apply the filter from the set of filters to a reconstructed sample to determine an intermediate sample value; apply a second stage ALF to the current sample, wherein to apply the second stage ALF, the one or more processors are further configured to: select a second filter from a second set of filters based on a second class index; and apply the second filter to the intermediate sample value to determine a second sample modification value; and determine the final filtered sample value based on the sample modification value and the second sample modification value.

Clause 22B: The device of any of clauses 15B-20B, wherein the one or more processors are further configured to: apply a first stage adaptive loop filter (ALF) to the current sample, wherein to apply the first stage ALF, the one or more processors are further configured to: determine a first class index for the current sample; select a filter from a first set of filters based on the first class index; and apply the filter from the first set of filters to a reconstructed sample to determine a first intermediate sample value; apply a second stage ALF to the current sample, wherein applying the second stage ALF, wherein the one or more processors are further configured to: determine a second class index for the current sample; select a second filter from a second set of filters based on the second class index; apply the second filter to the current sample to determine a second sample modification value; determine a third sample modification value based on the first intermediate sample value; and determine the final filtered sample value based on the sample modification value, the second sample modification value, and the third sample modification value.

Clause 23B: The device of clause 22B, wherein to determine the final filtered sample value based on the sample modification value, the second sample modification value, and the third sample modification value, the one or more processors are further configured to add the sample modification value, the second sample modification value, and the third sample modification value to the current sample.

Clause 24B: The device of any of clauses 15B-23B, wherein to apply one or more of the deblocking filter or the sample adaptive offset filter to the pre-filtered reconstructed block to determine the filtered reconstructed block, the one or more processors are further configured to apply the deblocking filter to a pre-filtered reconstructed sample to determine a filtered reconstructed sample.

Clause 25B: The device of any of clauses 15B-23B, wherein to apply the one or more of the deblocking filter or the sample adaptive offset filter to the pre-filtered reconstructed block to determine the filtered reconstructed block, the one or more processors are further configured to apply the deblocking filter and the sample adaptive offset filter to a pre-filtered reconstructed sample and to determine a filtered reconstructed sample.

Clause 26B: The device of any of clauses 15B-25B, wherein the value of the pre-filtered neighboring sample comprises a value of a neighboring sample before one or both of the deblock filter or the sample adaptive offset filter are applied to the neighboring sample.

Clause 27B: The device of any of clauses 15B-25B, wherein the one or more processors are further configured to: output a picture of video data that includes the final filtered reconstructed block.

Clause 28B: The device of any of clauses 15B-27B, wherein the device comprises a wireless communication device, further comprising a receiver configured to receive the video data.

Clause 29B: The device of clause 28B, wherein the wireless communication device comprises a telephone handset and wherein the receiver is configured to demodulate, according to a wireless communication standard, a signal comprising the video data.

Clause 30B: The device of any of clauses 15B-29B, further comprising: a display configured to display decoded video data.

Clause 31B: The device of any of clauses 15B-30B, wherein the device comprises one or more of a camera, a computer, a mobile device, a broadcast receiver device, or a set-top box.

Clause 32B: The device of any of clauses 15B-31B, wherein the device comprises a video encoding device.

Clause 33B: A computer-readable storage medium storing instructions that when executed by one or more processors cause the one or more processors to: determine a pre-filtered reconstructed block of video data; apply one or more of a deblocking filter or a sample adaptive offset filter to the pre-filtered reconstructed block to determine a filtered reconstructed block; apply an adaptive loop filter (ALF) to the filtered reconstructed block to determine a final filtered reconstructed block, wherein to apply the ALF to the filtered reconstructed block, the instructions cause the one or more processors to: determine a difference value based on a difference between a value of a current sample of the filtered reconstructed block and a value of a pre-filtered neighboring sample; apply a filter to the difference value to determine a sample modification value; and determine a final filtered sample value based on the sample modification value.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

determining a pre-filtered reconstructed block of video data;

applying one or more of a deblocking filter or a sample adaptive offset filter to the pre-filtered reconstructed block to determine a filtered reconstructed block; and applying an adaptive loop filter (ALF) to the filtered reconstructed block to determine a final filtered reconstructed block, wherein applying the ALF to the filtered reconstructed block comprises:

determining a value of a current sample in the filtered reconstructed block;

identifying a neighboring sample in the pre-filtered reconstructed block based on a coordinate position of the current sample in the filtered reconstructed block and a coordinate offset;

determining a value of the neighboring sample in the pre-filtered reconstructed block;

determining a difference value based on a difference between the value of the current sample in the filtered reconstructed block and the value of the neighboring sample in the pre-filtered reconstructed block;

applying a filter to the difference value to determine a sample modification value; and determining a final filtered sample value based on the sample modification value.

2. The method of claim 1, wherein determining the difference value based on the difference between the value of the current sample and the value of the neighboring sample comprises setting the difference value equal to the difference.

3. The method of claim 1, wherein determining the difference value based on the difference between the value of the current sample and the value of the neighboring sample comprises setting the difference value equal to a maximum value in response to the difference between the value of the current sample and the value of the neighboring sample being greater than the maximum value.

4. The method of claim 1, wherein applying the ALF to the filtered reconstructed block further comprises:

determining a class index for the current sample;

selecting a filter based on the class index;

applying the selected filter to the current sample to determine a second sample modification value; and determining the final filtered sample value based on the sample modification value and the second sample modification value.

5. The method of claim 4, further comprising:

determining an activity metric for the current sample;

determining a direction metric for the current sample; and determining the class index based on an activity metric and the direction metric.

6. The method of claim 4, wherein applying the selected filter to the current sample comprises multiplying coefficients of the selected filter by values of corresponding filter support positions, the corresponding filter support positions comprising values of samples of the filtered reconstructed block.

7. The method of claim 1, further comprising:

applying a first stage adaptive loop filter (ALF) to the current sample, wherein applying the first stage ALF comprises:

determining a class index for the current sample;

selecting a filter from a set of filters based on the class index; and applying the filter from the set of filters to a reconstructed sample to determine an intermediate sample value;

applying a second stage ALF to the current sample, wherein applying the second stage ALF comprises:

selecting a second filter from a second set of filters based on a second class index; and applying the second filter to the intermediate sample value to determine a second sample modification value; and determining the final filtered sample value based on the sample modification value and the second sample modification value.

8. The method of claim 1, further comprising:

applying a first stage adaptive loop filter (ALF) to the current sample, wherein applying the first stage ALF comprises:

determining a first class index for the current sample;

selecting a filter from a first set of filters based on the first class index; and applying the filter from the first set of filters to a reconstructed sample to determine a first intermediate sample value;

applying a second stage ALF to the current sample, wherein applying the second stage ALF comprises:

determining a second class index for the current sample;

selecting a second filter from a second set of filters based on the second class index;

applying the second filter to the current sample to determine a second sample modification value;

determining a third sample modification value based on the first intermediate sample value; and determining the final filtered sample value based on the sample modification value, the second sample modification value, and the third sample modification value.

9. The method of claim 8, wherein determining the final filtered sample value based on the sample modification value, the second sample modification value, and the third sample modification value comprises adding the sample modification value, the second sample modification value, and the third sample modification value to the current sample.

10. The method of claim 1, wherein applying one or more of the deblocking filter or the sample adaptive offset filter to the pre-filtered reconstructed block to determine the filtered reconstructed block comprises applying the deblocking filter to a pre-filtered reconstructed sample to determine a filtered reconstructed sample.

11. The method of claim 1, wherein applying one or more of the deblocking filter or the sample adaptive offset filter to the pre-filtered reconstructed block to determine the filtered reconstructed block comprises applying the deblocking filter and the sample adaptive offset filter to a pre-filtered reconstructed sample to determine a filtered reconstructed sample.

12. The method of claim 1, wherein the value of the neighboring sample comprises a value of a neighboring sample before one or both of the deblock filter or the sample adaptive offset filter are applied to the neighboring sample.

13. The method of claim 1, further comprising:

outputting a picture of video data that includes the final filtered reconstructed block.

14. The method of claim 1, wherein the method of decoding is performed as part of a video encoding process.

15. A device for decoding video data, the device comprising:

a memory configured to store video data;

one or more processors implemented in circuitry and configured to:

determine a pre-filtered reconstructed block of video data;

apply one or more of a deblocking filter or a sample adaptive offset filter to the pre-filtered reconstructed block to determine a filtered reconstructed block;

apply an adaptive loop filter (ALF) to the filtered reconstructed block to determine a final filtered reconstructed block, wherein to apply the ALF to the filtered reconstructed block, the one or more processors are further configured to:

determine a value of a current sample in the filtered reconstructed block;

identify a neighboring sample in the pre-filtered reconstructed block based on a coordinate position of the current sample in the filtered reconstructed block and a coordinate offset;

determine a value of the neighboring sample in the pre-filtered reconstructed block;

determine a difference value based on a difference between the value of the current sample in the filtered reconstructed block and the value of the neighboring sample in the pre-filtered reconstructed block;

apply a filter to the difference value to determine a sample modification value; and determine a final filtered sample value based on the sample modification value.

16. The device of claim 15, wherein to determine the difference value based on the difference between the value of the current sample and the value of the neighboring sample, the one or more processors are further configured to set the difference value equal to the difference.

17. The device of claim 15, wherein to determine the difference value based on the difference between the value of the current sample and the value of the neighboring sample, the one or more processors are further configured to set the difference value equal to a maximum value in response to the difference between the value of the current sample and the value of the neighboring sample being greater than the maximum value.

18. The device of claim 15, wherein to apply the ALF to the filtered reconstructed block further, the one or more processors are further configured to:

determine a class index for the current sample;

select a filter based on the class index;

apply the selected filter to the current sample to determine a second sample modification value; and determine the final filtered sample value based on the sample modification value and the second sample modification value.

19. The device of claim 18, wherein the one or more processors are further configured to:

determine an activity metric for the current sample;

determine a direction metric for the current sample; and determine the class index based on an activity metric and the direction metric.

20. The device of claim 18, wherein to apply the selected filter to the current sample, the one or more processors are further configured to multiply coefficients of the selected filter by values of corresponding filter support positions, the corresponding filter support positions comprises values of samples of the filtered reconstructed block.

21. The device of claim 15, wherein the one or more processors are further configured to:

apply a first stage adaptive loop filter (ALF) to the current sample, wherein to apply the first stage ALF, the one or more processors are further configured to:

determine a class index for the current sample;

select a filter from a set of filters based on the class index; and apply the filter from the set of filters to a reconstructed sample to determine an intermediate sample value;

apply a second stage ALF to the current sample, wherein to apply the second stage ALF, the one or more processors are further configured to:

select a second filter from a second set of filters based on a second class index; and apply the second filter to the intermediate sample value to determine a second sample modification value; and determine the final filtered sample value based on the sample modification value and the second sample modification value.

22. The device of claim 15, wherein the one or more processors are further configured to:

apply a first stage adaptive loop filter (ALF) to the current sample, wherein to apply the first stage ALF, the one or more processors are further configured to:

determine a first class index for the current sample;

select a filter from a first set of filters based on the first class index; and apply the filter from the first set of filters to a reconstructed sample to determine a first intermediate sample value;

apply a second stage ALF to the current sample, wherein applying the second stage ALF, wherein the one or more processors are further configured to:

determine a second class index for the current sample;

select a second filter from a second set of filters based on the second class index;

apply the second filter to the current sample to determine a second sample modification value;

determine a third sample modification value based on the first intermediate sample value; and determine the final filtered sample value based on the sample modification value, the second sample modification value, and the third sample modification value.

23. The device of claim 22, wherein to determine the final filtered sample value based on the sample modification value, the second sample modification value, and the third sample modification value, the one or more processors are further configured to add the sample modification value, the second sample modification value, and the third sample modification value to the current sample.

24. The device of claim 15, wherein to apply one or more of the deblocking filter or the sample adaptive offset filter to the pre-filtered reconstructed block to determine the filtered reconstructed block, the one or more processors are further configured to apply the deblocking filter to a pre-filtered reconstructed sample to determine a filtered reconstructed sample.

25. The device of claim 15, wherein to apply the one or more of the deblocking filter or the sample adaptive offset filter to the pre-filtered reconstructed block to determine the filtered reconstructed block, the one or more processors are further configured to apply the deblocking filter and the sample adaptive offset filter to a pre-filtered reconstructed sample and to determine a filtered reconstructed sample.

26. The device of claim 15, wherein the value of the neighboring sample comprises a value of a neighboring sample before one or both of the deblock filter or the sample adaptive offset filter are applied to the neighboring sample.

27. The device of claim 15, wherein the one or more processors are further configured to:

output a picture of video data that includes the final filtered reconstructed block.

28. The device of claim 15, wherein the device comprises a wireless communication device, further comprising a receiver configured to receive the video data.

29. The device of claim 28, wherein the wireless communication device comprises a telephone handset and wherein the receiver is configured to demodulate, according to a wireless communication standard, a signal comprising the video data.

30. The device of claim 15, further comprising:

a display configured to display decoded video data.

31. The device of claim 15, wherein the device comprises one or more of a camera, a computer, a mobile device, a broadcast receiver device, or a set-top box.

32. The device of claim 15, wherein the device comprises a video encoding device.

33. A non-transitory computer-readable storage medium storing instructions that when executed by one or more processors cause the one or more processors to:

determine a pre-filtered reconstructed block of video data;

apply one or more of a deblocking filter or a sample adaptive offset filter to the pre-filtered reconstructed block to determine a filtered reconstructed block;

apply an adaptive loop filter (ALF) to the filtered reconstructed block to determine a final filtered reconstructed block, wherein to apply the ALF to the filtered reconstructed block, the instructions cause the one or more processors to:

determine a value of a current sample in the filtered reconstructed block;

identify a neighboring sample in the pre-filtered reconstructed block based on a coordinate position of the current sample in the filtered reconstructed block and a coordinate offset;

determine a value of the neighboring sample in the pre-filtered reconstructed block;

determine a difference value based on a difference between the value of the current sample in the filtered reconstructed block and the value of the neighboring sample in the pre-filtered reconstructed block;

apply a filter to the difference value to determine a sample modification value; and determine a final filtered sample value based on the sample modification value.

* * * * *